(12) United States Patent
Widenbrant et al.

(10) Patent No.: US 12,227,936 B2
(45) Date of Patent: Feb. 18, 2025

(54) TAPE, ARTICLE INCLUDING TAPE AND COMPOSITE LAYER, AND RELATED METHODS

(71) Applicant: 3M INNOVATIVE PROPERTIES COMPANY, St. Paul, MN (US)

(72) Inventors: Martin J. O. Widenbrant, Stillwater, MN (US); Stephen K. Sontag, Maple Grove, MN (US); Jeremy P. Gundale, Woodbury, MN (US); Kevin M. Lewandowski, Inver Grove Heights, MN (US); Jenna L. Richardson, St. Paul, MN (US); James A. Bergman, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 194 days.

(21) Appl. No.: 17/632,775

(22) PCT Filed: Aug. 5, 2020

(86) PCT No.: PCT/IB2020/057409
§ 371 (c)(1),
(2) Date: Feb. 3, 2022

(87) PCT Pub. No.: WO2021/024206
PCT Pub. Date: Feb. 11, 2021

(65) Prior Publication Data
US 2022/0282476 A1 Sep. 8, 2022

Related U.S. Application Data

(60) Provisional application No. 62/883,970, filed on Aug. 7, 2019.

(51) Int. Cl.
*E04B 1/62* (2006.01)
*B32B 5/14* (2006.01)
(Continued)

(52) U.S. Cl.
CPC .............. *E04B 1/625* (2013.01); *B32B 5/145* (2013.01); *B32B 5/147* (2013.01); *B32B 27/12* (2013.01);
(Continued)

(58) Field of Classification Search
CPC . E04B 1/625; B32B 2307/7246; B32B 27/12; B32B 2260/021; B32B 2260/046;
(Continued)

(56) References Cited

U.S. PATENT DOCUMENTS

RE24,906 E   12/1960   Ulrich
3,039,893 A   6/1962   Banigan, Jr.
(Continued)

FOREIGN PATENT DOCUMENTS

CN   1869375   11/2006
CN   201047117   4/2008
(Continued)

OTHER PUBLICATIONS

Mukhopadhyay, "A Review on Designing the Waterproof Breathable Fabrics Part I: Fundamental Principles and Designing Aspects of Breathable Fabrics", 2008, Journal of Industrial Textiles, vol. 37, No. 3, pp. 225-262.
(Continued)

*Primary Examiner* — Joanna Pleszczynska
(74) *Attorney, Agent, or Firm* — Kathleen B. Gross

(57) ABSTRACT

The tape incudes a water vapor-permeable air and water barrier article and a pressure sensitive adhesive layer. The air and water barrier article includes a fibrous layer having first and second major surfaces and a polymeric layer on a first major surface of the fibrous layer that penetrates into the fibrous layer but leaves at least some fibers exposed on the second major surface. The pressure sensitive adhesive layer is on the polymeric layer of the air and water barrier article.

(Continued)

The tape can retain greater than 50 percent by weight of mortar applied according to the Vertical Mortar Receptivity Evaluation. The article includes a substrate, the tape, and a composite layer comprising at least one of gypsum, lime, or cement. The composite layer is at least one of dried or cured on the second major surface of the fibrous layer. Methods of making the article are also described.

19 Claims, 2 Drawing Sheets

(51) Int. Cl.
    *B32B 7/12*         (2006.01)
    *B32B 13/00*       (2006.01)
    *B32B 27/12*       (2006.01)
    *B32B 27/28*       (2006.01)
    *B32B 38/00*       (2006.01)
    *C09J 7/29*         (2018.01)
    *C09J 7/38*         (2018.01)
    *E06B 1/62*         (2006.01)

(52) U.S. Cl.
    CPC ............... *B32B 27/285* (2013.01); *C09J 7/29* (2018.01); *C09J 7/385* (2018.01); *E06B 1/62* (2013.01); *B32B 2260/021* (2013.01); *B32B 2260/046* (2013.01); *B32B 2305/073* (2013.01); *B32B 2307/7246* (2013.01); *B32B 2405/00* (2013.01); *B32B 2419/00* (2013.01); *C09J 2203/346* (2020.08); *C09J 2433/00* (2013.01); *C09J 2471/00* (2013.01); *E06B 2001/628* (2013.01)

(58) Field of Classification Search
    CPC .. B32B 2305/073; C09J 7/29; C09J 2203/346
    See application file for complete search history.

(56) References Cited

U.S. PATENT DOCUMENTS

| | | | |
|---|---|---|---|
| 3,169,899 A | 2/1965 | Steuber |
| 3,426,754 A | 2/1969 | Bierenbaum |
| 3,532,589 A | 10/1970 | David |
| 3,592,795 A | 7/1971 | Ashby |
| 3,627,722 A | 12/1971 | Seiter |
| 3,632,557 A | 1/1972 | Brode |
| 3,711,445 A | 1/1973 | Chu |
| 3,831,342 A | 8/1974 | Rejsa |
| 3,900,102 A | 8/1975 | Hurst |
| 3,937,640 A | 2/1976 | Tajima |
| 4,067,844 A | 1/1978 | Barron |
| 4,153,594 A | 5/1979 | Wilson, Jr. |
| 4,201,808 A | 5/1980 | Cully |
| 4,329,384 A | 5/1982 | Vesley |
| 4,330,590 A | 5/1982 | Vesley |
| 4,345,053 A | 8/1982 | Rizk |
| 4,366,307 A | 12/1982 | Singh |
| 4,374,237 A | 2/1983 | Berger |
| 4,379,201 A | 5/1983 | Heilmann |
| 4,543,403 A | 9/1985 | Isayama |
| 4,576,999 A | 3/1986 | Eckberg |
| 4,593,068 A | 6/1986 | Hirose |
| 4,618,653 A | 10/1986 | Kawakubo |
| 4,618,656 A | 10/1986 | Kawakubo |
| 4,645,816 A | 2/1987 | Pohl |
| 4,654,417 A | 3/1987 | Inoue |
| 4,687,818 A | 8/1987 | Kawakubo |
| 4,737,559 A | 4/1988 | Kellen |
| 4,751,122 A | 6/1988 | May |
| 4,774,356 A | 9/1988 | Inoue |
| 4,786,667 A | 11/1988 | Shimizu |
| 4,822,451 A | 4/1989 | Ouderkirk |
| 4,900,772 A | 2/1990 | Imanaka |
| 4,904,732 A | 2/1990 | Iwahara |
| 4,904,745 A | 2/1990 | Inoue |
| 4,923,650 A | 5/1990 | Antoon |
| 4,960,844 A | 10/1990 | Singh |
| 4,984,584 A | 1/1991 | Hansen |
| 5,068,304 A | 11/1991 | Higuchi |
| 5,073,611 A | 12/1991 | Rehmer |
| 5,120,594 A | 6/1992 | Mrozinski |
| 5,198,064 A | 3/1993 | Tani |
| 5,223,583 A | 6/1993 | Higuchi |
| 5,256,231 A | 10/1993 | Gorman |
| 5,316,848 A | 5/1994 | Bartlett |
| 5,317,035 A | 5/1994 | Jacoby |
| 5,348,791 A | 9/1994 | Thompson |
| 5,364,955 A | 11/1994 | Zwiener |
| 5,374,477 A | 12/1994 | Lawless |
| 5,475,904 A | 12/1995 | LeRoy |
| 5,593,771 A | 1/1997 | Lawless |
| 5,756,751 A | 5/1998 | Schmalstieg |
| 5,811,566 A | 9/1998 | Watabe |
| 5,882,322 A | 3/1999 | Kim |
| 5,882,573 A | 3/1999 | Kwok |
| 5,895,301 A | 4/1999 | Porter |
| 5,972,147 A | 10/1999 | Janis |
| 5,986,014 A | 11/1999 | Kusakabe |
| 5,990,257 A | 11/1999 | Johnston |
| 6,001,946 A | 12/1999 | Waldman |
| 6,046,270 A | 4/2000 | Roesler |
| 6,176,961 B1 | 1/2001 | Mossbeck et al. |
| 6,197,912 B1 | 3/2001 | Huang |
| 6,235,365 B1 | 5/2001 | Schaughency |
| 6,361,634 B1 | 3/2002 | White |
| 6,495,229 B1 | 12/2002 | Carte |
| 6,534,129 B1 | 3/2003 | Miller et al. |
| 6,602,809 B1 | 8/2003 | Cabrey |
| 6,645,887 B2 | 11/2003 | Kocinec et al. |
| 6,706,225 B2 | 3/2004 | Cabrey |
| 6,901,712 B2 | 6/2005 | Borenstein |
| 6,904,649 B2 | 6/2005 | VanBenschoten |
| 7,060,750 B2 | 6/2006 | Jansen |
| 7,094,859 B2 | 8/2006 | Schindler |
| 7,153,923 B2 | 12/2006 | Schindler |
| 7,351,296 B2 | 4/2008 | Waggoner |
| 7,682,675 B2 | 3/2010 | Boge |
| 7,718,250 B2 | 5/2010 | Sieber |
| 7,829,488 B2 | 11/2010 | Bennett |
| 7,833,916 B2 | 11/2010 | Leeser |
| 7,846,504 B2 | 12/2010 | Maier |
| 7,867,591 B2 | 1/2011 | Sieber |
| 8,001,736 B2 | 8/2011 | Goldberg |
| 8,061,098 B2 | 11/2011 | Whelan |
| 8,215,083 B2 | 7/2012 | Toas |
| 8,277,915 B2 | 10/2012 | Couturier |
| 8,334,227 B2 | 12/2012 | Tee |
| 8,399,088 B2 | 3/2013 | Deng |
| 8,535,786 B2 | 9/2013 | Schroer |
| 8,551,594 B2 | 10/2013 | Deiss |
| 8,609,213 B2 | 12/2013 | Wiercinski et al. |
| 8,613,181 B2 | 12/2013 | Jay |
| 8,826,611 B2 | 9/2014 | Veilleux |
| 8,883,284 B2 | 11/2014 | Todt |
| 8,893,440 B2 | 11/2014 | Wetmore |
| 8,931,228 B2 | 1/2015 | Wiercinski et al. |
| 8,931,229 B2 | 1/2015 | Wiercinski et al. |
| 8,986,786 B2 | 3/2015 | Maier |
| 9,085,899 B1 | 7/2015 | Bertrand |
| 9,102,774 B2 | 8/2015 | Clapper |
| 9,133,612 B2 | 9/2015 | Wiercinski et al. |
| 9,192,960 B2 | 11/2015 | Tanley |
| 9,238,203 B2 | 1/2016 | Scheibner |
| 9,266,144 B2 | 2/2016 | Maier |
| 9,394,464 B2 | 7/2016 | Wiercinski et al. |
| 9,476,196 B2 | 10/2016 | Wiercinski et al. |
| 9,562,174 B2 | 2/2017 | Russell |
| 9,731,314 B2 | 8/2017 | Maier |
| 10,704,254 B2 | 7/2020 | Seabaugh |
| 11,105,089 B2 | 8/2021 | Widenbrant |
| 11,365,328 B2 | 6/2022 | Seabaugh |

(56) References Cited

U.S. PATENT DOCUMENTS

| | | |
|---|---|---|
| 11,512,463 B2 | 11/2022 | Widenbrant |
| 11,731,394 B2 | 8/2023 | Seabaugh |
| 2002/0108564 A1 | 8/2002 | Gruenewald |
| 2003/0017292 A1 | 1/2003 | Sieber |
| 2003/0051807 A1 | 3/2003 | Yamaguchi |
| 2003/0056722 A1 | 3/2003 | Kitano et al. |
| 2003/0070391 A1 | 4/2003 | Tachauer |
| 2003/0165651 A1 | 9/2003 | Sieber |
| 2003/0180468 A1 | 9/2003 | Cray |
| 2004/0081794 A1 | 4/2004 | Titone |
| 2004/0137185 A1 | 7/2004 | Sieber |
| 2004/0137813 A1 | 7/2004 | Faucher |
| 2004/0224117 A1 | 11/2004 | Amano |
| 2005/0028938 A1 | 2/2005 | Hill |
| 2005/0058798 A1 | 3/2005 | Sieber |
| 2005/0069698 A1 | 3/2005 | Eubanks |
| 2005/0137549 A1 | 6/2005 | Lindsay et al. |
| 2006/0040091 A1 | 2/2006 | Bletsos |
| 2006/0051558 A1 | 3/2006 | Sieber |
| 2006/0065342 A1* | 3/2006 | Porter ............... B28B 19/0092 156/45 |
| 2007/0042196 A1 | 2/2007 | Smith |
| 2007/0060732 A1 | 3/2007 | Yang |
| 2007/0110943 A1 | 5/2007 | Sieber |
| 2007/0281562 A1 | 12/2007 | Kohlman |
| 2007/0282080 A1 | 12/2007 | Kawakami |
| 2007/0293112 A1 | 12/2007 | Hanson |
| 2008/0022620 A1 | 1/2008 | Crowley |
| 2008/0058492 A1 | 3/2008 | Griswold |
| 2008/0114098 A1 | 5/2008 | Griswold |
| 2008/0135159 A1 | 6/2008 | Bries |
| 2008/0153924 A1 | 6/2008 | Caron |
| 2008/0258341 A1 | 10/2008 | Parkes |
| 2008/0289279 A1 | 11/2008 | Hannan |
| 2009/0075033 A1 | 3/2009 | Weston |
| 2009/0317583 A1 | 12/2009 | Naumann |
| 2010/0012882 A1 | 1/2010 | Sherman |
| 2010/0154338 A1 | 6/2010 | Riccelli |
| 2010/0307658 A1 | 12/2010 | Galush et al. |
| 2011/0151169 A1 | 6/2011 | Maier |
| 2011/0185666 A1 | 8/2011 | Russell |
| 2011/0244742 A1 | 10/2011 | Huang |
| 2012/0088052 A1 | 4/2012 | Cantu |
| 2012/0174508 A1 | 7/2012 | Brooks |
| 2012/0207998 A1 | 8/2012 | Ando |
| 2013/0004749 A1 | 1/2013 | Hao |
| 2013/0059105 A1 | 3/2013 | Wright |
| 2013/0059144 A1 | 3/2013 | Garlich |
| 2013/0084419 A1 | 4/2013 | Taylor |
| 2013/0196163 A1 | 8/2013 | Swanson |
| 2013/0274700 A1 | 10/2013 | Harris |
| 2014/0037882 A1 | 2/2014 | Georgeau |
| 2014/0093679 A1 | 4/2014 | Okamoto |
| 2014/0186566 A1 | 7/2014 | Wood |
| 2015/0024159 A1 | 1/2015 | Bess |
| 2015/0225614 A1 | 8/2015 | Kim |
| 2015/0267076 A1 | 9/2015 | Bodkhe |
| 2015/0298427 A1 | 10/2015 | Kronenberg |
| 2015/0368508 A1 | 12/2015 | Bodkhe |
| 2016/0024782 A1 | 1/2016 | Bess |
| 2016/0376794 A1 | 12/2016 | Keene |
| 2017/0058510 A1* | 3/2017 | Seabaugh ............... E04B 1/625 |
| 2017/0072430 A1 | 3/2017 | Maier |
| 2017/0173916 A1 | 6/2017 | Widenbrant |
| 2017/0218223 A1 | 8/2017 | Bodkhe |
| 2018/0001595 A1 | 1/2018 | Seabaugh |
| 2021/0054675 A1 | 2/2021 | Widenbrant |

FOREIGN PATENT DOCUMENTS

| | | |
|---|---|---|
| CN | 202866172 | 4/2013 |
| CN | 105331298 | 2/2016 |
| DE | 19817829 | 1/1999 |
| DE | 10255600 | 6/2004 |
| EP | 0372561 | 6/1990 |
| EP | 0676403 | 10/1995 |
| EP | 1289754 | 11/2003 |
| EP | 1459884 | 11/2006 |
| EP | 2 101 027 | 12/2014 |
| EP | 2 868 468 | 5/2015 |
| FR | 2917758 | 12/2008 |
| GB | 2473618 | 3/2011 |
| JP | S50156599 | 12/1975 |
| JP | S546096 | 1/1979 |
| JP | S55-13767 | 1/1980 |
| JP | S55-13768 | 1/1980 |
| JP | S57164123 | 10/1982 |
| JP | S59-122541 | 7/1984 |
| JP | S6422904 | 1/1989 |
| JP | H04-055444 | 9/1992 |
| JP | H06172631 | 6/1994 |
| JP | H06211922 | 8/1994 |
| JP | H08-053528 | 2/1996 |
| JP | 11071823 | 3/1999 |
| JP | H1160724 | 3/1999 |
| JP | H11100427 | 4/1999 |
| JP | H11116763 | 4/1999 |
| JP | 2000-169544 | 6/2000 |
| JP | 2000-169545 | 6/2000 |
| JP | 2001-072854 | 3/2001 |
| JP | 2001-294830 | 10/2001 |
| JP | 2001-323040 | 11/2001 |
| JP | 2002-155145 | 5/2002 |
| JP | 2002-212415 | 7/2002 |
| JP | 3313360 | 8/2002 |
| JP | 2002-249538 | 9/2002 |
| JP | 2004-137405 | 5/2004 |
| JP | 2004-137861 | 5/2004 |
| JP | 2008-303650 | 12/2008 |
| WO | WO 95/33007 | 12/1995 |
| WO | WO 1998-056866 | 12/1998 |
| WO | WO 2001-034922 | 5/2001 |
| WO | WO 2002-01013 | 1/2002 |
| WO | WO 2012-092019 | 7/2012 |
| WO | WO 2013-136108 | 9/2013 |
| WO | WO 2014-121007 | 8/2014 |
| WO | WO 2015-010208 | 1/2015 |
| WO | WO 2015-123007 | 8/2015 |
| WO | WO 2015-126645 | 8/2015 |
| WO | WO 2015-183354 | 12/2015 |
| WO | WO 2016-106273 | 6/2016 |
| WO | WO 2017-112756 | 6/2017 |

OTHER PUBLICATIONS

Pocius, "Adhesion and Adhesives Technology", Hanser/Gardner Publications., 1997 Cincinnati, Ohio, pp. 216-223.

Premium Self-adhering Water Resistive and Air Barrier, Delta Cosella Dorken, Spycor Building Products < https://www.spycorbuilding.com/Cosella-Dorken-DELTA-VENT-SA-p/dlvt-sa.htm >, pp. 1-3.

Satas, Handbook of Pressure Sensitive Adhesive Technology, 172, (1989).

Satas, "Handbook of Pressure Sensitive Adhesive Technology", New York, Chapter 15, 1989, pp. 396-456.

Wang, "Controlled/"living" radical polymerization. Atom transfer radical polymerization in the presence of transition-metal complexes", 1995., Journal of the American Chemical Society, vol. 117, No. 20, pp. 5614-5615.

International Search Report for PCT International Application No. PCT/IB2020/057409, mailed on Nov. 3, 2020, 4 pages.

* cited by examiner

TAPE, ARTICLE INCLUDING TAPE AND COMPOSITE LAYER, AND RELATED METHODS

CROSS-REFERENCE TO RELATED APPLICATION

This application is a national stage filing under 35 U.S.C. 371 of PCT/IB2020/057409, filed Aug. 5, 2020, which claims priority to U.S. Provisional Application No. 62/883,970, filed Aug. 7, 2019, the disclosure of which is incorporated by reference in its entirety herein.

BACKGROUND

Air barrier systems control movement of air, and specifically water vapor, across a surface of a structure, such as a building enclosure. In exterior walls, uncontrolled air flow is the greatest source of moisture and condensation damage. Indoor comfort is affected by air temperature, relative humidity, direction of airflow and surrounding surface temperatures. Indoor air quality is enhanced by air barrier systems that efficiently keep pollutants out of building interiors. Examples of pollutants include water vapor, suspended particulates, dust, insects, and smells. Condensation of water vapor within a wall structure is a key contributor to corrosion and mold growth. Air barrier systems have significant impact on electricity consumption and gas bills. Air barrier systems in nonresidential buildings are estimated to reduce air leakage by up to 83 percent, reduce heating bills more than 40% and reduce electricity consumption more than 25% according to simulations by the National Institute of Standards and Technology (NIST) compared to typical buildings without air barriers. Air barrier systems help prevent water vapor from being transported by air movement between exteriors and interiors of structures, such as buildings.

Flashing tapes are an important part of the overall building envelope that tie into these air barrier membranes at details (i.e. windows, door, penetrations, etc.). Flashing tapes are generally non-permeable to air and water. These products are applied on the exterior sheathing layer of buildings, which is commonly plywood, oriented strand board (OSB), foam insulation sheathing, exterior grade gypsum sheathing board, concrete, concrete masonry units (CMUs), or other conventional sheathing materials commonly used in the construction industry. There are construction practices around the world that require some of these flashing tapes to be able to accept mortar/plaster/cement over the tape backings. Such practices are common in Europe around window and door flashings.

U.S. Pat. No. 9,085,899 (Bertrand) describes tapes for affixing one or more geomembrane sheets to a concrete slab. The tape adheres to the one or more geomembrane sheets and includes gripping extensions that include distal ends for embedding into the concrete slab.

A self-sealing air and water barrier article is described in WO 2015/183354 (Widenbrant et al.). A roll of an easy-to-apply air and water barrier article is described in WO 2015/126931 (Seabaugh et al.).

SUMMARY

The present disclosure provides mortar-receptive tapes and articles and methods that allow composite layers including at least one of gypsum, lime, or cement to be applied to a tape, for example, in building construction. The tape incudes a water vapor-permeable air and water barrier article and a pressure sensitive adhesive layer. The air-and-water-barrier article includes a fibrous layer having first and second major surfaces and a polymeric layer on a first major surface of the fibrous layer that penetrates into the fibrous layer but leaves at least some fibers exposed on the second major surface. The tape may be part of a flashing tape, a seaming tape, or another construction product.

Mechanical fasteners can be used to affix waterproofing sheets on substrates of exterior walls. As a result, moisture may permeate from gaps of such fasteners, such as nail holes, over a long period of time. It is useful for flashing tape and seaming tape, for example, to pass ASTM D-1970/D-1970M-13 or similar modified tests such as Modified Test 1 of ASTM D-1970/D-1970M-13, Modified Test 2 of ASTM D-1970/D-1970M-13, Modified Test 3 of ASTM D-1970/D-1970M-13, or combinations thereof for nail sealability. We have found it challenging to achieve a mortar-receptive tape that also passes such tests for nail sealability.

In one aspect, the present disclosure provides a tape that includes a water vapor-permeable air-and-water barrier article and a pressure sensitive adhesive layer. The air-and-water-barrier article includes a fibrous layer having first and second major surfaces and a polymeric layer on a first major surface of the fibrous layer that penetrates into the fibrous layer but leaves at least some fibers exposed on the second major surface. The pressure sensitive adhesive layer is on the polymeric layer of the air and water barrier article. The tape can retain greater than 50 percent by weight of mortar applied according to the Vertical Mortar Receptivity Evaluation. In some embodiments, the tape advantageously passes at least one of Modified Test 1 of ASTM D-1970/D-1970M-13, Modified Test 2 of ASTM D-1970/D-1970M-13, or Modified Test 3 of ASTM D-1970/D-1970M-13.

In another aspect, the present disclosure provides an article that includes a substrate, a tape, and a composite layer. The tape includes a water vapor-permeable air-and-water barrier article and a pressure sensitive adhesive layer. The air-and-water-barrier article includes a fibrous layer having first and second major surfaces and a polymeric layer on a first major surface of the fibrous layer that penetrates into the fibrous layer but leaves at least some fibers exposed on the second major surface. The pressure sensitive adhesive layer is on the polymeric layer of the air and water barrier article and attaches the tape to the substrate. The composite layer includes at least one of gypsum, lime, or cement, and the composite layer is at least one of dried or cured on the second major surface of the fibrous layer. In some embodiments, the tape advantageously passes at least one of Modified Test 1 of ASTM D-1970/D-1970M-13, Modified Test 2 of ASTM D-1970/D-1970M-13, or Modified Test 3 of ASTM D-1970/D-1970M-13.

In another aspect, the present disclosure provides a method of making the aforementioned article. The method includes applying the tape to the substrate using the pressure sensitive adhesive layer, applying a composition comprising at least one of gypsum, lime, or cement to the second major surface of the fibrous layer, and at least one of curing or drying the composition to form the composite layer on the second major surface of the fibrous layer.

In another aspect, the present disclosure provides a method of installing at least one of a door or window. The method includes attaching a tape to at least a portion of a door or window frame, the tape including an air and water barrier article that is water vapor permeable, the air and water barrier article having a fibrous layer having first and second major surfaces and a polymeric layer disposed on a first major surface of the fibrous layer and penetrating into the fibrous layer leaving at least some fibers exposed on the second major surface, and a pressure sensitive adhesive layer disposed on the polymeric layer of the air and water barrier article, which attaches the tape to the portion of the door or window frame, applying a composition comprising at least one of gypsum, lime, or cement to the second major surface of the fibrous layer; and at least one of curing or drying the composition to form a composite layer on the second major surface of the fibrous layer. In some embodiments, the tape advantageously passes at least one of Modified Test 1 of ASTM D-1970/D-1970M-13, Modified Test 2 of ASTM D-1970/D-1970M-13, or Modified Test 3 of ASTM D-1970/D-1970M-13.

In this application, terms such as "a", "an" and "the" are not intended to refer to only a singular entity but include the general class of which a specific example may be used for illustration. The terms "a", "an", and "the" are used interchangeably with the term "at least one". The phrases "at least one of" and "comprises at least one of" followed by a list refers to any one of the items in the list and any combination of two or more items in the list. All numerical ranges are inclusive of their endpoints and non-integral values between the endpoints unless otherwise stated (e.g. 1 to 5 includes 1, 1.5, 2, 2.75, 3, 3.8, 4, and 5, and the like).

The terms "first" and "second" are used in this disclosure in their relative sense only. It will be understood that, unless otherwise noted, those terms are used merely as a matter of convenience in the description of one or more of the embodiments.

The term "layer" refers to any material or combination of materials on or overlaying a substrate.

Words of orientation such as "atop, "on," "covering," "uppermost," "overlaying," "underlying" and the like for describing the location of various layers, refer to the relative position of a layer with respect to a horizontally-disposed, upwardly-facing substrate. It is not intended that the substrate, layers or articles encompassing the substrate and layers, should have any particular orientation in space during or after manufacture.

The term "(meth)acrylate" with respect to a monomer, oligomer or means a vinyl-functional alkyl ester formed as the reaction product of an alcohol with an acrylic or a methacrylic acid.

The term "(co)polymer" or "(co)polymeric" includes homopolymers and copolymers, as well as homopolymers or copolymers that may be formed in a miscible blend, e.g., by coextrusion or by reaction, including, e.g., transesterification. The term "copolymer" includes random, block, graft, and star copolymers.

The term "water vapor permeable" as used herein means an article having a permeance of more than 1 perm (inch-pounds units) according to ASTM E 96 Procedure A (Desiccant Method).

The term "continuous" as used herein means a coating having an uninterrupted extension along a two dimensional surface. For example, in some embodiments, in an air and water barrier article having a continuous water-permeable polymer coating, the water-permeable polymeric coating covers a major surface of the fibrous layer.

The term "discontinuous" as used herein means a coating having an interrupted extension along a two dimensional surface. For example, in some embodiments, an air and water barrier article having a discontinuous coating of pressure sensitive adhesive does not cover a major surface of a polymeric layer or a major surface of a fibrous layer.

The term "air and water barrier" as used herein means material that is designed and constructed to provide the principal plane of air tightness through an environmental separator and that has an air permeance rate no greater than 0.02 L per square meter per second at a pressure difference of 75 Pa when tested in accordance with ASTM E 2178-13 and provides acceptable barrier performance with respect to water according to AATCC 127-2013. In some embodiments, the air and water barrier is impermeable to liquid water at 55 cm of water pressure.

The terms "cure" and "curable" refer to joining polymer chains together by covalent chemical bonds, usually via crosslinking molecules or groups, to form a network polymer. Therefore, in this disclosure the terms "cured" and "crosslinked" may be used interchangeably. A cured or crosslinked polymer is generally characterized by insolubility but may be swellable in the presence of an appropriate solvent.

The above summary of the present disclosure is not intended to describe each disclosed embodiment or every implementation of the present disclosure. The description that follows more particularly exemplifies illustrative embodiments. It is to be understood, therefore, that the drawings and following description are for illustration purposes only and should not be read in a manner that would unduly limit the scope of this disclosure.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

Figure 1:
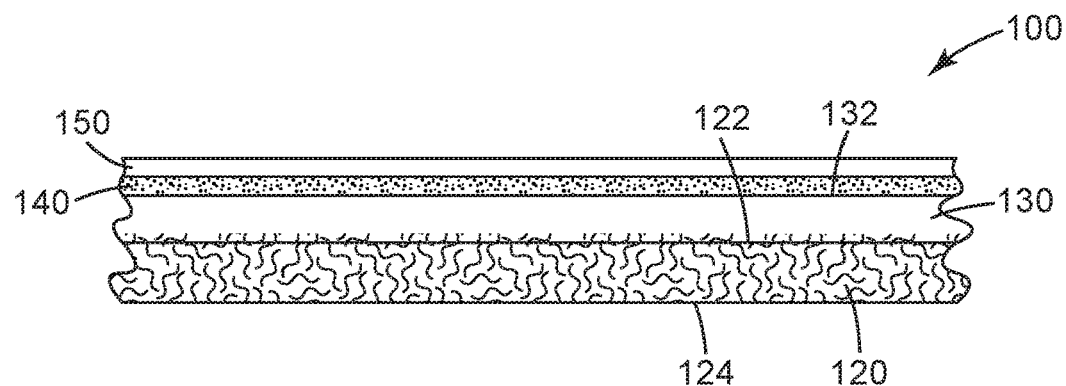
FIG. 1 is a side view of an embodiment of a tape of the present disclosure.

FIG. 1 illustrates an embodiment of a tape 100 of the present disclosure. The tape 100 includes a fibrous layer 120 having a first and second major surfaces 122, 124. A polymeric layer 130 is disposed on a first major surface 122 of the fibrous layer 120 and penetrates into the fibrous layer 120, leaving at least some fibers exposed on the second major surface 124. Together, the fibrous layer 120 and polymer layer 130 form an air and water barrier article that is water-vapor permeable. Adhesive 140 is disposed on a major surface 132 of the polymer layer 130 opposite the fibrous layer 120. In the illustrated embodiment, the adhesive 140 is attached to a liner 150 that is typically removable.

Figure 2:
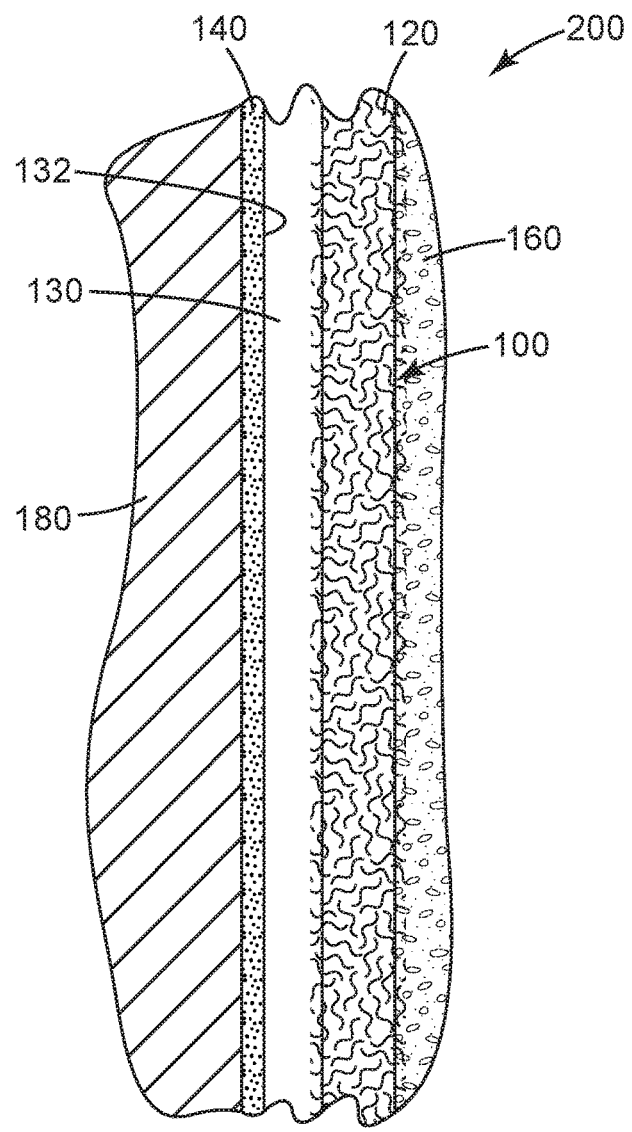
FIG. 2 is a side view of an embodiment of an article of the present disclosure adhered to a vertical substrate.

FIG. 2 illustrates an embodiment of an article 200 of the present disclosure. The article 200 include tape 100 as shown in FIG. 1 and a composite layer 160. The adhesive 140 on the major surface 132 of the polymer layer 130 adheres the air and water barrier article to substrate 180. The composite layer 160 is on the second major surface 124 of the fibrous layer. The fibers on the second major surface 124 of the fibrous layer 120 that are not covered by the polymeric material of the polymeric layer 130 can be embedded into the composite layer 160.

The composite layer 160 useful in the article of the present disclosure and illustrated in FIG. 2 can include a variety of materials. In some embodiments, the composite layer includes at least one of aggregate (e.g., sand, gravel, or crushed rock) combined with a binder. The binder can comprise at least one of gypsum, lime, or cement. Examples of useful composite layers include mortar, stucco, plaster, and concrete layers. The composite layer is generally applied as a composition to the second major surface 124 of the fibrous layer 120. The composition typically further includes water. The composite layer may be at least one of dried (e.g., having the water removed) or cured (e.g., by reaction of the binder).

Referring again to FIGS. 1 and 2, in some embodiments of the tape 100, the adhesive 140 is a pressure sensitive adhesive that is continuously disposed on major surface 132 of polymer layer 130. The pressure sensitive adhesive is generally disposed only on one surface of the air and water barrier article, that is, the major surface 132 of polymer layer 130. In some embodiments, the adhesive 140 is discontinuously disposed on the major surface 132 polymer layer 130 in a random manner. In some embodiments, the adhesive 140 is discontinuously disposed on the major surface 132 of polymer layer 130 in a patterned manner.

In some embodiments, the pressure sensitive adhesive layer is continuous. In some of these embodiments, the pressure sensitive adhesive has a permeance in a range from 1 perm to 10 perms. In some embodiments, the pressure sensitive adhesive useful for practicing the present disclosure is impermeable to water vapor (that is, having a permeance of less than 1 perm). In some of these embodiments, to retain a desired level of water vapor permeance in the tape, the pressure sensitive adhesive layer is discontinuous in order to leave portions of the major surface 132 of the polymeric layer 130 uncoated with adhesive. For discontinuous layers, typically in the range of about 10% to 90%, more typically about 30% to 80%, most typically 40% to 70%, of the area of the major surface 132 of the polymeric layer 130 is covered with adhesive. In other words, at least 10% to 90%, in some embodiments 20% to 70% or 30% to 60%, of the area of the major surface 132 of the polymer layer 130 is typically adhesive-free in order to maintain sufficient water vapor permeability of the tape.

Discontinuous layers of pressure sensitive adhesive may be applied in a random fashion or in a specific pattern. Some examples of discontinuous coatings of adhesive are described, for example, in U.S. Pat. No. 3,039,893 (Banigan, Jr.), U.S. Pat. No. 3,426,754 (Bierenbaum), U.S. Pat. No. 5,374,477 (Lawless), U.S. Pat. No. 5,593,771 (Lawless), U.S. Pat. No. 5,895,301 (Porter), U.S. Pat. No. 6,495,229 (Carte), and U.S. Pat. No. 6,901,712 (Lionel) and Int. Pat. Appl. Pub. Nos. WO 2015/126645 (Maier et al.) and WO 2015/126931 (Seabaugh et al.).

To prevent the lateral movement of air between the air and water barrier article and the substrate to which it is bonded and through lap joints of the air and water barrier article, the adhesive coated areas of the air and water barrier article can be made to intersect to isolate the uncoated areas, thereby eliminating channels through which air can laterally move. This can be achieved by any number of patterns, such as intersecting circles with adhesive free centers, intersecting squares or rectangles of adhesive, and intersecting strips in a checkered pattern. To prevent any water from moving from one longitudinal side edge of the tape to the other, in some embodiments, a continuous pressure sensitive adhesive layer can be beneficial.

The pressure sensitive adhesive layer useful in the tape, article, and methods of the present disclosure may suitably have a variety of thicknesses, in some embodiments, at a thickness of 0.001 inches to 0.1 inch (about 0.0254 millimeters (mm) to 2.54 mm). In some embodiments, the pressure sensitive adhesive layer has a thickness of 0.003 inches to 0.025 inches (about 0.0762 mm to 0.635 mm) or at a thickness of 0.005 inches to 0.02 inches (about 0.127 mm to 0.508 mm). In some embodiments, the pressure sensitive adhesive layer has a thickness of 0.001 inches to 0.01 inches (about 0.0254 mm to 0.254 mm). Coating thickness influences water vapor permeability. Accordingly, pressure sensitive adhesive layers having a thickness of 0.001 inches to 0.01 inches (about 0.0254 mm to 0.254 mm) may be useful for maximizing the water vapor permeability of the tape disclosed herein. In some of these embodiments, the pressure sensitive adhesive has a permeance in a range from 1 perm to 10 perms. In some of these embodiments, the pressure sensitive adhesive layer is continuous.

The air and water barrier article useful for practicing the present disclosure includes a fibrous layer. The fibrous layer may comprise a variety of suitable materials including woven fabrics, nonwoven webs, knitted fabrics (e.g., made by warp knitting, weft insertion knitting, and circular knitting), netting, scrim, and combinations thereof. In some embodiments, the fibrous layer comprises a woven, nonwoven, or knit material. Useful fibrous layers may be made of natural fibers (e.g., natural cellulosic fibers such as wood, cotton, flax, hemp, jute, and ramie), synthetic fibers (e.g., thermoplastic fibers), or a combination of natural and synthetic fibers. Examples of suitable materials for forming thermoplastic fibers include polyolefins (e.g., polyethylene, polypropylene, polybutylene, ethylene copolymers, propylene copolymers, butylene copolymers, and copolymers and blends of these polymers), polyesters, rayon, polyamides, and polylactic acid. The fibers may also be multi-component fibers, for example, having a core of one thermoplastic material and a sheath of another thermoplastic material. The term "nonwoven" refers to a material having a structure of individual fibers or threads that are interlaid but not in an identifiable manner such as in a knitted fabric. Examples of nonwoven webs include spunbond webs, spunlaced webs, airlaid webs, wetlaid webs, meltblown webs, and bonded carded webs. In some embodiments, the fibrous layer comprises multiple layers of nonwoven materials with, for example, at least one layer of a meltblown nonwoven and at least one layer of a spunbonded nonwoven, or any other suitable combination of nonwoven materials. For example, the fibrous layer may be a spunbond-meltblown-spunbond, spunbond-spunbond, or spunbond-spunbond-spunbond multilayer material. In some embodiments, the fibrous layer is a nonwoven comprising fibers selected from polyester, polylactic acid, polyolefin, polyamide, rayon, and combinations thereof.

In some embodiments, the fibers in the fibrous layer are surface-modified. Useful methods of surface modification include electrical discharge in the presence of a suitable reactive or non-reactive atmosphere (e.g., plasma, glow discharge, corona discharge, dielectric barrier discharge or atmospheric pressure discharge); chemical pretreatment; UV flash lamp pretreatment; or flame pretreatment. Any of these methods may be useful, for example, for incorporating polar functional groups (e.g., carboxylic acid (i.e., —COOH) groups and hydroxyl (i.e., —OH) groups) on the surface of the fibers.

In some embodiments, the fibers in the fibrous layer are surface modified by treatment with surfactants. Useful surfactants (also known as emulsifiers) include anionic, cationic, amphoteric, and nonionic surfactants. Useful anionic surfactants include alkylarylether sulfates and sulfonates, alkylarylpolyether sulfates and sulfonates (e.g., alkylarylpoly(ethylene oxide) sulfates and sulfonates, including those having up to about 4 ethyleneoxy repeat units, including sodium alkylaryl polyether sulfonates such as those known under the trade designation "TRITON X200", available from Rohm and Haas, Philadelphia, PA), alkyl sulfates and sulfonates (e.g., sodium lauryl sulfate, ammonium lauryl sulfate, triethanolamine lauryl sulfate, and sodium hexadecyl sulfate), alkylaryl sulfates and sulfonates (e.g., sodium dodecylbenzene sulfate and sodium dodecylbenzene sulfonate), alkyl ether sulfates and sulfonates (e.g., ammonium lauryl ether sulfate), and alkylpolyether sulfate and sulfonates (e.g., alkyl poly(ethylene oxide) sulfates and sulfonates, including those having up to about 4 ethyleneoxy units). Useful nonionic surfactants include ethoxylated oleoyl alcohol and polyoxyethylene octylphenyl ether. Useful cationic surfactants include mixtures of alkyl dimethylbenzyl ammonium chlorides, wherein the alkyl chain has from 10 to 18 carbon atoms. Amphoteric surfactants are also useful and include sulfobetaines, N-alkylaminopropionic acids, and N-alkylbetaines. Surfactants may be added to the fibers disclosed herein, for example, in an amount sufficient on average to make a monolayer coating over the surfaces of the fibers to impart a desired level of wettability and hydrophilicity. Useful amounts of surfactants may be in a range, for example, from 0.05 to 3 percent by weight, based on the total weight of the fibrous layer. A surfactant can be applied to the fibrous layer by any conventional means (e.g., spraying, printing, dipping, or brush coating). Several surfactant-treated fibrous materials are also commercially available. For example, a spunbond polyester nonwoven fabric having a fabric weight of 80 grams/square meter, available as Type 062 Grey from Freudenberg Performance Materials LP, Durham, NC, is treated with surfactant.

In some embodiments, fibrous layer can be surface modified by including additives in the polymer during fiber formation. An additive such as a surfactant (e.g., any of those described above) used during fiber formation can migrate to the surface to provide a surface-modified fibrous layer.

In some embodiments, the fibrous layer is hydrophilic or has a hydrophilic surface. The fibrous layer may be considered to be hydrophilic or have a hydrophilic surface if water can spread on the surface, and the contact angle of a bead of water on the surface is less than about 90 degrees. Fibrous layers that are surface modified using any of the methods described above and/or include fibers such as natural cellulosic fibers, polyamide, polyester, or rayon fibers are generally hydrophilic.

In general, the fibrous layer is not considered an air and water barrier material on its own.

A variety of water-vapor permeable polymeric materials are useful for the polymeric layer in the tape and article of the present disclosure for coating and at least partially penetrating into the fibrous layer described above in any of its embodiments. In some embodiments, the polymeric layer comprises a polyoxyalkylene polymer having at least one end group derived from an alkoxy silane. The polyoxyalkylene polymer may be silane terminated. In some embodiments, the polyoxyalkylene polymer further comprises at least one silane-modified branched group. When the polymeric coating is cured, the alkoxy silane groups condense to form crosslink sites. In some embodiments, the polymeric layer is crosslinked. In some embodiments, the polymeric layer comprises a polyoxyalkylene polymer having at least one crosslink site derived from any alkoxy silane.

A production method of a polyoxyalkylene polymer having a reactive silicon group may include those proposed in Japanese Kokoku Publication S45-36319, Japanese Kokoku Publication S46-12154, Japanese Kokai Publication S50-156599, Japanese Kokai Publication S54-6096, Japanese Kokai Publication S55-13767, Japanese Kokai Publication S55-13468, Japanese Kokai Publication S57-164123, Japanese Kokoku Publication H3-2450, U.S. Pat. Nos. 3,632,557, 4,345,053, 4,366,307, and 4,960,844. Also, useful polymers for the air and water barrier articles according to the present disclosure include polyoxyalkylene polymers having a number average molecular weight of 6,000 or higher and a Mw/Mn ratio of 1.6 or lower and thus having high molecular weight and narrow molecular weight distribution as disclosed in Japanese Kokai Publication S61-197631, Japanese Kokai Publication S61-215622, Japanese Kokai Publication S61-215623, Japanese Kokai Publication S61-218632, Japanese Kokai Publication H3-72527, Japanese Kokai Publication H3-47825, and Japanese Kokai Publication H8-231707.

In some embodiments, the main chain of the polyoxyalkylene polymer may contain other functional groups such as a urethane bond. The urethane bond component is not particularly limited and may include a segment (hereinafter, also referred to as an amido segment) produced by reaction of an isocyanato group and an active hydrogen group.

The amido segment can be represented by the following formula:

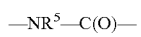

—NR$^5$—C(O)—

(wherein R$^5$ represents a hydrogen atom or a monovalent organic group, desirably a substituted or unsubstituted monovalent C$_{1-20}$ hydrocarbon group, and more desirably a substituted or unsubstituted monovalent C$_{1-8}$ hydrocarbon group).

The aforementioned amido segment may be part of a urethane group produced, for example, by reaction of an isocyanato group and a hydroxy group; a urea group produced by reaction of an isocyanato group and an amino group; and a thiourethane group produced by reaction of an isocyanato group and a mercapto group. Also, in the present disclosure, groups produced by reaction of an active hydrogen in the aforementioned urethane group, urea group, and thiourethane group with another isocyanato group also include a segment represented by the formula —NR$^5$—C(O)—.

Examples of methods for industrially producing a polyoxyalkylene polymer having an amido segment and a reactive silicon group include those disclosed in Japanese Kokoku Publication S46-12154 (U.S. Pat. No. 3,632,557), Japanese Kokai Publications S58-109529 (U.S. Pat. No. 4,374,237), S62-13430 (U.S. Pat. No. 4,645,816), H8-53528 (EP 0676403), and H10-204144 (EP 0831108), Japanese Kohyo Publication 2003-508561 (U.S. Pat. No. 6,197,912), Japanese Kokai Publications H6-211879 (U.S. Pat. No. 5,364,955), H10-53637 (U.S. Pat. No. 5,756,751), H11-100427, 2000-169544, 2000-169545 and 2002-212415, Japanese Patent No. 3,313,360, U.S. Pat. Nos. 4,067,844 and 3,711,445, Japanese Kokai Publications 2001-323040, H11-279249 (U.S. Pat. No. 5,990,257), 2000-119365 (U.S. Pat. No. 6,046,270), S58-29818 (U.S. Pat. No. 4,345,053), H3-47825 (U.S. Pat. No. 5,068,304), H11-60724, 2002-155145, and 2002-249538, WO03/018658, WO03/059981, and Japanese Kokai Publication H6-211879 (U.S. Pat. No. 5,364,955), H10-53637 (U.S. Pat. No. 5,756,751), H10-204144 (EP0831108), 2000-169544, 2000-169545, and 2000-119365 (U.S. Pat. No. 6,046,270).

A (meth) acrylic ester polymer having a reactive silicon group may be added to the polyoxyalkylene polymer having a reactive silicon group, if desired. Various (meth) acrylic ester monomers may be useful for providing the main chain of the (meth) acrylic ester polymer. Examples of useful (meth) acrylic ester monomers include methyl (meth) acrylate, ethyl (meth) acrylate, n-propyl (meth) acrylate, isopropyl (meth) acrylate, n-butyl (meth) acrylate, isobutyl (meth) acrylate, t-butyl (meth) acrylate, n-pentyl (meth) acrylate, n-hexyl (meth) acrylate, cyclohexyl (meth) acrylate, n-heptyl (meth) acrylate, n-octyl (meth) acrylate, 2-ethylhexyl (meth) acrylate, nonyl (meth) acrylate, decyl (meth) acrylate, dodecyl (meth) acrylate, phenyl (meth) acrylate, tolyl (meth) acrylate, benzyl (meth) acrylate, 2-methoxyethyl (meth) acrylate, 3-methoxybutyl (meth) acrylate, 2-hydroxyethyl (meth) acrylate, 2-hydroxypropyl (meth) acrylate, stearyl (meth) acrylate, glycidyl (meth) acrylate, 2-aminoethyl (meth) acrylate, gamma-(methacryloyloxypropyl) trimethoxysilane, gamma-(methacryloyloxypropyl) dimethoxymethylsilane, methacryloyloxymethyltrimethoxysilane, methacryloyloxymethyltriethoxysilane, methacryloyloxymethyldimethoxymethylsilane, methacryloyloxymethyldiethoxymethylsilane, ethylene oxide adduct of (meth) acrylic acid, trifluoromethylmethyl (meth) acrylate, 2-trifluoromethylethyl (meth) acrylate, 2-perfluoroethylethyl (meth) acrylate, 2-perfluoroethyl-2-perfluorobutylethyl (meth) acrylate, perfluoroethyl (meth) acrylate, trifluoromethyl (meth) acrylate, bis(trifluoromethyl) methyl (meth) acrylate, 2-trifluoromethyl-2-perfluoroethylethyl (meth) acrylate, 2-perfluorohexylethyl (meth) acrylate, 2-perfluorodecylethyl (meth) acrylate, and 2-perfluorohexadecylethyl (meth) acrylate.

With respect to the (meth) acrylic ester polymer, vinyl monomers can be copolymerized together with a (meth) acrylic ester monomer. Examples of suitable vinyl monomers include styrene monomers such as styrene, vinyltoluene, alpha-methylstyrene, chlorostyrene, styrenesulfonic acid and its salts; fluorine-containing vinyl monomers such as perfluoroethylene, perfluoropropylene, and vinylidene fluoride; silicon-containing vinyl monomers such as vinyltrimethoxysilane and vinyltriethoxysilane; maleic anhydride, maleic acid, and monoalkyl and dialkyl esters of maleic acid; fumaric acid, and monoalkyl and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile group-containing vinyl monomers such as acrylonitrile and methacrylonitrile; amido group-containing vinyl monomers such as acrylamide and methacrylamide; vinyl esters such as vinyl acetate, vinyl propionate, vinyl pivalate, vinyl benzoate, and vinyl cinnamate; alkenes such as ethylene and propylene; conjugated dienes such as butadiene and isoprene; and vinyl chloride, vinylidene chloride, allyl chloride, and allyl alcohol. Any of these monomers may be used alone or any combination of them may be copolymerized with the (meth) acrylic acid monomer. In some embodiments, polymers comprising a styrene monomer and/or a (meth)acrylic acid monomer are desirable. In the above descriptions, (meth) acrylic acid means acrylic acid and/or methacrylic acid.

The (meth) acrylic ester polymer can be prepared, for example, by a conventionally known method. For example, a "living radical polymerization" method can be conveniently employed in order to obtain a (meth) acrylic ester polymer having narrow molecular weight distribution and low viscosity and having a reactive silicon group at a molecular chain end at a high ratio. An "atom transfer radical polymerization" method is a living radical polymerization method useful for polymerizing a (meth) acrylic ester monomer using, for example, an organic halide or a halogenated sulfonyl compound as an initiator and a transition metal complex as a catalyst. An atom transfer radical polymerization method advantageously has a wide range of options for the initiator and the catalyst. Because a halogen is located at a molecular chain end, which is relatively advantageous for a functional group conversion reaction, the atom transfer radical polymerization method is useful as a production method of the (meth) acrylic ester polymer having a specified functional group. Examples of the atom transfer radical polymerization method include the method disclosed in Krzysztof Matyjaszewski et al., J. Am. Chem. Soc, vol. 117, p. 5614 (1995) and the method disclosed in Japanese Kokai Publication H9-272714.

Other examples of a production method of the (meth) acrylic ester polymer having a reactive silicon group are production methods employing free radical polymerization methods using chain transfer agents and disclosed in Japanese Kokoku Publication H3-14068, Japanese Kokoku Publication H4-55444, and Japanese Kokai Publication H6-211922. The above-mentioned (meth) acrylic ester polymers having a reactive silicon group may be used alone or two or more kinds of them may be used in combination.

Examples of methods for producing an organic polymer involving blending a polyoxyalkylene polymer having a reactive silicon group with a (meth) acrylic ester polymer having a reactive silicon group include those disclosed in Japanese Kokai Publication S59-122541, S63-11264, H6-172631, and H11-116763. Further, a production method for a polyoxyalkylene polymer obtained by blending the (meth) acrylic ester polymer having a reactive silicon group may also include a method of polymerizing a (meth) acrylic ester monomer in the presence of a polyoxyalkylene polymer having a reactive silicon group. Examples of these methods include those disclosed in Japanese Kokai Publication 559-78223, Japanese Kokai Publication S59-168014, Japanese Kokai Publication S60-228516, and Japanese Kokai Publication 560-228517.

Some of the silyl terminated polymers useful in the air and water barrier articles according to the present disclosure are commercially available, for example, from Kaneka Corporation under the trade designations "KANEKA MS POLYMER" and "KANEKA SILYL", and from Union Carbide Specialty Chemicals Division under the trade designations "SILMOD-SAT10", "SILMOD SAT30", "SILMOD SAT 200", "SILMOD S203", "SILMOD S303", "SILMOD 20A", to name several, which were obtained from Union Carbide Company. It has been reported that resins available under the trade designation "SILMOD" have substantially the same chemistries as some resins available under the trade designations "MS" and "SILYL" from Kanegafuchi Kagaku Kogyo Kabushiki Kaisha, Osaka Japan. For example, the material available under trade designation "SILMOD 5203" corresponds to the material available under trade designation "MS S203", the material available under trade designation "SILMOD S303" corresponds to the material available under trade designation "MS S303", and the material available under trade designation "SILMOD 20A" corresponds to the material available under trade designation "MS 20A". In further examples, the composition available under the trade designation "SILMOD SAT10" corresponds to the composition available under the trade designation "SILYL SAT10", the composition available under the trade designation "SILMOD SAT30" corresponds to the composition available under the trade designation "SILYL SAT30", and the composition available under the trade designation "SILMOD 200" corresponds to the composition available under the trade designation "SILYL 200".

Materials useful in the presently disclosed polymeric layer include solid materials and foam materials. In some embodiments, the foam material includes closed cell foams.

Polymeric layers useful for the tapes and articles of the present disclosure may optionally include various additives such as dehydrating agents, rheology additives, compatibilizers, tackifiers, physical property modifiers, photocurable substances, oxygen-curable substances, storage stability improving agents, fillers, epoxy resins, epoxy resin curing agents antioxidants, adhesion promoters, ultraviolet absorbers, metal deactivators, antiozonants, antioxidants, light stabilizers, lubricants, amine type radical chain inhibitors, phosphorus-containing peroxide decomposers, lubricants, pigments, foaming agents, solvents, flame retardants, antifungal agents, blowing agents, and antistatic agents, each in any adequate amount. These additives may be added singly to the polymeric layer or two or more thereof may be added in combination to the polymeric layer. Specific examples of these additives are disclosed in publications such as Japanese Kokoku Publications H4-69659 and H7-108928, and Japanese Kokai Publications 563-254149, S64-22904, 2001-72854, and 2008-303650.

In the polymeric layers useful for the tape and article of the present disclosure, at least one of UV stabilizers or antioxidants may be present in an amount from 0 to 5 parts per 100 parts of the silyl terminated polymer. These materials improve heat stability and UV resistance. Some useful UV stabilizers and antioxidants are commercially available, for example, those available under the trade designations "TINUVIN 770", "TINUVIN 327", "TINUVIN 1130" and "TINUVIN 292" from BASF, Florham Park, NJ.

In some embodiments, a polymeric coating composition useful for providing the polymeric layer includes at least 0.1 weight percent (wt %), in some embodiments at least 0.5 wt % of one or more water scavengers, and at most 5 wt %, in some embodiments at most 2 wt % of one or more water scavengers. Examples of suitable water scavengers include silanes such as vinyltrimethoxysilane, vinyltriethoxysilane, vinylmethyldimethoxysilane, O-methylcarbamatomethylmethyldimethoxysilane, O-methylcarbamatomethyltrimethoxysilane, O-ethylcarbamatomethyl-methyldiethoxysilane, O-ethylcarbamatomethyl-triethoxysilane, 3-methacryloyloxypropyl-trimethoxysilane, methacryloyloxymethyl-trimethoxysilane, methacryloyloxymethylmethyldimethoxysilane, methacryloyloxymethyltriethoxysilane, methacryloxymethylmethyl-diethoxysilane, 3-acryloxyoylpropyl-trimethoxysilane, acryloyloxymethyltrimethoxysilane, acryloyloxymethylmethyldimethoxysilane, acrylmethyltriethoxysilane, acryloyloxymethylmethyldiethoxysilane, alkylalkoxysilanes in general, and other functionalized organosilanes such as aminosilanes, which are also described below as adhesion promoters.

In some embodiments, a polymer coating composition useful for providing the polymeric layer includes at least 0.1 wt %, in some embodiments, at least 0.5 wt %, of one or more adhesion promoters.

In some embodiments, the presently disclosed polymeric materials include at most 5 wt %, in some embodiments, at most 2 wt %, of one or more adhesion promoters. Useful adhesion promoters include those available under the trade designations "A1120", "A187", and "A189" from OSI and "Z9020" from Dow Chemical. Amino silanes can be used as adhesion promoters. Examples of amino silane useful as adhesion promoters include gamma-aminopropyltrimethoxysilane, gamma-aminopropyltriethoxysilane, gamma-aminopropyltriisopropoxysilane, gamma-aminopropylmethyldimethoxysilane, gamma-aminopropylmethyldiethoxysilane, gamma-(2-aminoethyl) aminopropyltrimethoxysilane, gamma-(2-aminoethyl) aminopropylmethyldimethoxysilane, gamma-(2-aminoethyl)aminopropyltriethoxysilane, gamma-(2-aminoethyl)aminopropylmethyldiethoxysilane, gamma-(2-aminoethyl)aminopropyltriisopropoxysilane, gamma-(6-aminohexyl)aminopropyltrimethoxysilane, 3-(N-ethylamino)-2-methylpropyltrimethoxysilane, 2-aminoethylaminomethyltrimethoxysilane, N-cyclohexylaminomethyltriethoxysilane, N-cyclohexylaminomethyldiethoxymethylsilane, gamma-ureidopropyltrimethoxysilane, gamma-ureidopropyltriethoxysilane, N-phenyl-gamma-aminopropyltrimethoxysilane, N-phenylaminomethyltrimethoxysilane, N-benzyl-gamma-aminopropyltrimethoxysilane, N-vinylbenzyl-gamma-aminopropyltriethoxysilane, N,N-bis[3-trimethoxysilyl]propyl]ethylenediamine, N-cyclohexylaminomethyltrimethoxysilane, N-cyclohexylaminomethyldimethoxymethylsilane, and N-phenylaminomethyltrimethoxysilane.

In some embodiments, a polymer coating composition useful for providing the polymeric layer may comprise one or more catalysts. The catalyst may be present in the polymeric material in an amount of from about 0.05 wt % to about 5 wt %, in some embodiments from about 0.1 wt % to about 2 wt %, and in some embodiments, from about 0.1 wt % to about 1 wt %. Useful catalysts include organometallic compounds which are known as silanol condensation catalysts. Examples of suitable silanol condensation catalysts include titanate esters such as tetrabutyl titanate and tetrapropyl titanate; organotin compounds such as dibutyltin dilaurate, dibutyltin maleate, dibutyltin diacetate, stannous octylate, stannous naphthenate, reaction products from dibutyltin oxide and phthalate esters, and dibutyltin diacetylacetonate; organoaluminum compounds such as aluminum trisacetylacetonate, aluminum tris(ethylacetoacetate) and diisopropocyaluminum ethyl acetoacetate; reaction products from bismuth salts and organic carboxylic acids, such as bismuth tris(2-ethylhexanonate) and bismuth tris(neodecanoate); chelate compounds such as zirconium tetra-acetylacetonate and titanium tetra-acetylacetonate; organolead compounds such as lead octylate; organovanadium compounds; amines such as butylamine, octylamine, dibutylamine, monoethanolamine, oleylamine, cyclohexylamine, benzylamine, diethylaminopropylamine, xylenediamine, triethylenediamine, guanidine, diphenylguanidine, 2,4,6-tris (dimethylaminomethyl)phenol, morpholine, N-methylmorpholine, 2-ethyl-4-methylimidazole with carboxylic or other acids; low-molecular-weight polyamide resins derived from excess polyamines and polybasics acids; and reaction products from excess polyamines and epoxy compounds. Any of these may be used individually or in combination.

In some embodiments, the polymeric layer useful for practicing the present disclosure comprises one or more pigments or fillers. Useful fillers are typically solids that are non-reactive with the other components of the polymeric layer and fibrous layer. Useful fillers include, for example, clay, talc, dye particles, pigments and colorants (for example, titanium dioxide and carbon black), glass beads, metal oxide particles, silica particles, ceramic microspheres, hollow polymeric microspheres (such as those available under the trade designation "EXPANCEL 551 DE" from Akzo Nobel, Duluth, Ga.), hollow glass microspheres (such as those available under the trade designation "K37" from 3M Co., St Paul, Minn.), carbonates, metal oxides, silicates (e.g. talc, asbestos, clays, mica), sulfates, silicon dioxide and aluminum trihydrate.

Some specific examples include ground or light calcium carbonate (with or without a surface-treatment such as a fatty acid, resin acid, cationic surfactant, or anionic surfactant); magnesium carbonate; talc; sulfates such as barium sulfate; alumina; metals in powder form (e.g., aluminum, zinc and iron); bentonite; kaolin clay; quartz powder; and combinations of two or more of these.

Examples of useful organic pigments include halogenated copper phthalocyanines, aniline blacks, anthraquinone blacks, benzimidazolones, azo condensations, arylamides, diarylides, disazo condensations, isoindolinones, isoindolines, quinophthalones, anthrapyrimidines, flavanthrones, pyrazolone oranges, perinone oranges, beta-naphthols, arylamides, quinacridones, perylenes, anthraquinones, dibromoanthrones, pyranthrones, diketopyrrolo-pyrrole pigments (DPP), dioxazine violets, copper and copper-free phthalocyanines, and indanthrones.

Examples of useful inorganic pigments include titanium dioxide, zinc oxide, zinc sulphide, lithopone, antimony oxide, barium sulfate, carbon black, graphite, black iron oxide, black micaceous iron oxide, brown iron oxides, metal complex browns, lead chromate, cadmium yellow, yellow oxides, bismuth vanadate, lead chromate, lead molybdate, cadmium red, red iron oxide, Prussian blue, ultramarine, cobalt blue, chrome green (Brunswick green), chromium oxide, hydrated chromium oxide, organic metal complexes, and lake dye pigments.

The filler can also comprise conductive particles (see, for example, U.S. Patent Application Pub. No. 2003/0051807) such as carbon particles or metal particles of silver, copper, nickel, gold, tin, zinc, platinum, palladium, iron, tungsten, molybdenum, or solder or the like. It is also possible to use non-conductive particles of a polymer such as polyethylene, polystyrene, phenol resin, epoxy resin, acryl resin or benzoguanamine resin, or glass beads, silica, graphite or a ceramic, whose surfaces have been covered with a conductive coating of a metal.

In some embodiments, the polymeric layer includes inorganic solids such as talc, titanium dioxide, silica, zirconia, calcium carbonate, calcium magnesium carbonate, glass or ceramic microspheres, or combinations thereof. In some embodiments, the polymeric layer includes at least one of titanium dioxide or calcium carbonate.

In some embodiments, the polymeric layer useful in the tape and article of the present disclosure comprises a plasticizer. In some of these embodiments, the plasticizer does not contain any groups reactive toward silane/alkoxysilane. Examples of suitable plasticizers for the polymeric material include which polyethers, polyether esters, esters of organic carboxylic acids or anhydrides thereof, such as phthalates (e.g., dialkyl phthalates such as di-(2-ethylhexyl)phthalate, dibutyl phthalate, diethyl phthalate, dioctyl phthalate, butyl octyl phthalate, dicyclohexyl phthalate, butyl benzyl phthalate, dioctyl phthalate, diisononyl phthalate, and diisodecyl phthalate); adipates (e.g., di-(2-ethylhexyl)adipate, diisooctyl adipate, octyl decyladipate; and dioctyl adipate); alkyl azelates (e.g., di(2-ethylhexyl)azelate and di-(2-ethylbutyl) azelate); and dialkyl sebacates (e.g., dibutyl sebacate, dioctylsebacate, and diisooctyl sebacate). Other suitable plasticizers include phosphates such as triaryl phosphates (e.g., tricresyl phosphate, triphenyl phosphate, cresyl(liphenyl phosphate); trialkyl phosphates (e.g., trioctyl phosphate and tributyl phosphate; alkoxyalkyl phosphates (e.g., trisbutoxyethyl phosphate); and alkyl aryl phosphates (e.g., octyl-diphenyl phosphate); citrates such as acetyl tri-n-butyl citrate, acetyl triethyl citrate, monoisopropyl citrate, triethyl citrate, mono-, di-, and tri-stearyl citrate; triacetin; p-tert-butyl; n-octyl benzoate; 2-ethylhexyl benzoate; isooctyl benzoate; n-nonyl benzoate; n-decyl benzoate; isodecyl benzoate; 2-propylheptyl benzoate; n-undecyl benzoate; isoundecyl benzoate; n-dodecyl benzoate; isododecyl benzoate; isotridecyl benzoate; n-tridecyl benzoate; triisononyl trimellitate; C13-rich C11-C14-alkyl benzoates, and combinations thereof. In some embodiments, plasticizers useful for practicing the present disclosure include esters, such as triethylene glycol bis (2-ethylhexanoate) commercially available under the trade designation "Eastman TEG-EH" from Eastman. In some embodiments, at least one of diethylene glycol monobenzoate, diethylene glycol dibenzoate, propylene glycol monobenzoate, propylene glycol dibenzoate, polypropylene glycol monobenzoate, polypropylene glycol dibenzoate can be used individually or in combination with any of the aforementioned plasticizers.

The amount of plasticizer employed, if one is employed, will depend on the nature of the polymeric resin and the plasticizer.

A polymer coating composition useful for providing the polymeric layer may comprise one or more organic solvents, for example, when it is coated onto the fibrous layer. Examples of suitable solvents include non-reactive compounds which may be aliphatic, aromatic, or araliphatic. Examples of suitable solvents include methoxypropyl acetate, methoxyethyl acetate, ethylene glycol diacetate, propylene glycol diacetate, glyme, diglyme, dioxane, tetrahydrofuran, dioxolane, tert-butyl methyl ether, ethyl acetate, butyl acetate, chloroform, methylene chloride, chlorobenzene, o-dichlorobenzene, anisole, 1,2-dimethoxybenzene, phenyl acetate, N-methyl-2-pyrrolidone, dimethylformamide, N,N-dimethylacetamide, dimethyl sulphoxide, acetonitrile, phenoxyethyl acetate, and combinations of two or more of these. In some embodiments, the solvent comprises at least one of methoxypropyl acetate, acetone, 2-butanone, xylene, toluene, cyclohexanone, 4-methyl-2-pentanone, 1-methoxyprop-2-yl acetate, ethylene glycol monomethyl ether, 3-methoxy-n-butyl acetate, white spirit, more highly substituted aromatics such as those commercially available, for example, under the trade designations "NAPHTHA", "SOLVESSO", "ISOPAR", "NAPPAR" from Deutsche EXXON CHEMICAL GmbH, Cologne, DE; "SHELLSOL" from Deutsche Shell Chemie GmbH, Eschbom, DE; methyl n-amyl ketone ("MAK") and "AROMATIC 100" "AROMATIC 150" from ExxonMobil Chemical; xylene, methyl isobutyl ketone ("MIBK"), and ethyl 3-ethoxypropionate from Eastman Chemical Company.

The polymer-coated fibrous layer forms a water-vapor permeable air and water barrier. Any suitable coating method may be useful for applying the polymer coating composition to the fibrous layer. For example, spray coating and gravure coating may be useful. In some embodiments, the polymer-coated fibrous layer has a moisture vapor transmission rate of at least 5 perms, at least 10 perms, or at least 15 perms.

We have found it challenging to achieve a mortar-receptive tape that also passes tests for nail sealability. While exposed fibers are generally useful for mortar-receptivity, too many exposed fibers can provide pathways, for example, for air and water leakage through the tape when the tape is penetrated by a fastener, for example. The basis weight of the fibrous layer can influence mortar-receptivity and nail sealability. In some embodiments, the fibrous layer has a basis weight of at least 20 grams per square meter (gsm), 30 gsm, 40 gsm, 50 gsm, 60 gsm, 70 gsm, or 80 gsm. The basis weight of the fibrous layer may range, e.g., from at least about 20 gsm, 30 gsm, or 40 gsm, up to about 200 gsm or 100 gsm. Basis weights in these ranges may be useful for achieving a balance between nail sealability and mortar receptivity. While higher basis weights can also provide a desired combination of mortar receptivity and nail sealability, a relatively large amount of a polymeric composition may be required to form the polymeric layer, which may be undesirable. The fibrous layer may be up to about 5 mm, about 2 mm, or about 1 mm in thickness and/or at least about 0.1, about 0.2, or about 0.5 mm in thickness.

Another factor that can influence the nail sealability and mortar receptivity of the tape of the present disclosure is the lamination pressure used to apply a polymer composition and the fibrous layer to form the air and water barrier article. Considering the thickness and basis weight of the fibrous layer, the lamination pressure can be selected such that a useful amount of fibers of the fibrous layer may be exposed for mortar receptivity without adversely affecting nail sealability.

Another factor that can influence the mortar receptivity and nail sealability is the polymer coating composition used to provide the polymeric layer. A lower viscosity polymer coating composition can penetrate further into the fibrous layer than a higher viscosity polymer coating, leaving fewer of the fibers of the fibrous layer exposed. The viscosity of the polymer coating composition can be influenced by the selection of polymer, the amount of plasticizers and lower molecular weight additives (e.g., adhesion promoters, water scavengers, and solvents), inorganic fillers, and rheology modifiers (e.g., fumed silica). In some embodiments, the polymer coating composition includes at least 0.25 percent, 0.3 percent, 0.4 percent, 0.5 percent, or 1 percent by weight fumed silica, based on the total weight of the polymeric coating composition. The presence of trialkoxy silane groups in the polymer precursor and the presence of filler in the polymeric layer can also improve the nail sealability of the tape. In some embodiments, the polymeric layer includes at least 10, 15, 20, 25, or 30 weight percent filler, including any of the fillers described above.

Advantageously, in some embodiments, the tape described herein can retain greater than 50 percent by weight of mortar applied according to the Vertical Mortar Receptivity Evaluation described in the Examples, below. In some embodiments, the tape advantageously passes at least one of Modified Test 1 of ASTM D-1970/D-1970M-13, Modified Test 2 of ASTM D-1970/D-1970M-13, or Modified Test 3 of ASTM D-1970/D-1970M-13, which are carried out as described in the Examples, below.

The tape of the present disclosure includes a pressure sensitive adhesive (PSA). PSAs are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as PSAs are polymers designed and formulated to exhibit the requisite viscoelastic properties resulting in a desired balance of tack, peel adhesion, and shear holding power.

One method useful for identifying pressure sensitive adhesives is the Dahlquist criterion. This criterion defines a pressure sensitive adhesive as an adhesive having a creep compliance of greater than $3 \times 10^{-6}$ cm$^2$/dyne as described in Handbook of Pressure Sensitive Adhesive Technology, Donatas Satas (Ed.), 2nd Edition, p. 172, Van Nostrand Reinhold, New York, NY, 1989. Alternatively, since modulus is, to a first approximation, the inverse of creep compliance, pressure sensitive adhesives may be defined as adhesives having a storage modulus of less than about $3 \times 10^5$ N/m$^2$.

A variety of PSAs may be useful on the tape and the article of the present disclosure. Examples of suitable PSAs include natural rubber-, acrylic-, block copolymer-, silicone-, polyisobutylene-, polyvinyl ether-, polybutadiene-, cor and urea-based pressure sensitive adhesive and combinations thereof. These PSAs can be prepared, for example, as described in Adhesion and Adhesives Technology, Alphonsus V. Pocius, Hanser/Gardner Publications, Inc., Cincinnati, Ohio, 1997, pages 216 to 223, Handbook of Pressure Sensitive Adhesive Technology, Donatas Satas (Ed.), 2nd Edition, Van Nostrand Reinhold, New York, NY, 1989, Chapter 15, and U.S. Pat. No. Re 24,906 (Ulrich). Another example of a pressure sensitive adhesive useful in assembling architectural structures (e.g., buildings) is a rubber modified asphalt (bitumen) pressure sensitive adhesive or a synthetic rubber pressure sensitive adhesive.

In some embodiments, the adhesive is selected to be a solventless or hot melt adhesive. In some embodiments, solvent-based adhesives or water-based adhesives may be used. Examples of suitable adhesives include radiation-cured adhesives (e.g., ultraviolet (UV) radiation or electron-beam cured (co)polymers resulting from polymerizable monomers or oligomers). Suitable hot melt adhesives may contain (co)polymers such as butyl rubber, styrene-butadiene-styrene (SBS), styrene-isoprene-styrene (SIS), styrene butadiene (SB), styrene-ethylene-butadiene-styrene (SEBS), and ethylene/vinylacetate (EVA). Tackifying resins, which generally refer to materials that are compatible with the elastomer and have a number average molecular weight of up to 10,000 grams per mole, are typically added to these elastomers. Useful tackifying resins can have a softening point of at least 70° C. as determined using a ring and ball apparatus and a glass transition temperature of at least −30° C. as measured by differential scanning calorimetry. In some embodiments, the tackifying resin comprises at least one of rosin, a polyterpene (e.g., those based on α-pinene, β-pinene, or limonene), an aliphatic hydrocarbon resin (e.g., those based on cis- or trans-piperylene, isoprene, 2-methylbut-2-ene, cyclopentadiene, dicyclopentadiene, or combinations thereof), an aromatic resin (e.g. those based on styrene, α-methyl styrene, methyl indene, indene, coumarone, or combinations thereof), or a mixed aliphatic-aromatic hydrocarbon resin. Any of these tackifying resins may be hydrogenated (e.g., partially or completely). Natural and petroleum waxes, oil, and bitumen may be useful as additives to the pressure sensitive adhesive composition.

In some embodiments, PSAs compositions that are useful in the tape and article of the present disclosure are acrylic PSAs. As used herein, the term "acrylic" or "acrylate" includes compounds having at least one of acrylic or methacrylic groups. Useful acrylic PSAs can be made, for example, by combining at least two different monomers. Examples of suitable first monomers include 2-methylbutyl acrylate, 2-ethylhexyl acrylate, isooctyl acrylate, lauryl acrylate, n-decyl acrylate, 4-methyl-2-pentyl acrylate, isoamyl acrylate, sec-butyl acrylate, isononyl acrylate, and methacrylates of the foregoing acrylates. Suitable first monomers include mixtures of at least two or at least three structural isomers of a secondary alkyl (meth)acrylate of Formula (I):

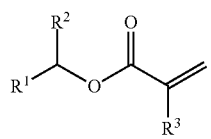

(I)

wherein $R^1$ and $R^2$ are each independently a $C_1$ to $C_{30}$ saturated linear alkyl group, in which the sum of the number of carbons in $R^1$ and $R^2$ is 7 to 31, and $R^3$ is H or $CH_3$. The sum of the number of carbons in $R^1$ and $R^2$ can be, in some embodiments, 7 to 27, 7 to 25, 7 to 21, 7 to 17, 7 to 11, or 7. Methods for making and using such monomers and monomer mixtures are described in U.S. Pat. No. 9,102,774 (Clapper et al.).

Examples of suitable second monomers useful for preparing acrylic PSAs include a (meth)acrylic acid (e.g., acrylic acid, methacrylic acid, itaconic acid, maleic acid, and fumaric acid), a (meth)acrylamide (e.g., acrylamide, methacrylamide, N-ethyl acrylamide, N-hydroxyethyl acrylamide, N-octyl acrylamide, N-t-butyl acrylamide, N,N-dimethyl acrylamide, N,N-diethyl acrylamide, N-ethyl-N-dihydroxyethyl acrylamide, and methacrylamides of the foregoing acrylamides), a (meth)acrylate (e.g., 2-hydroxyethyl acrylate or methacrylate, cyclohexyl acrylate, t-butyl acrylate, isobornyl acrylate, and methacrylates of the foregoing acrylates), N-vinyl pyrrolidone, N-vinyl caprolactam, an alpha-olefin, a vinyl ether, an allyl ether, a styrenic monomer, or a maleate. In some embodiments, the PSA in the tape of the present disclosure includes a pendent carboxylic acid group incorporated into the PSA by including, for example, acrylic acid, methacrylic acid, itaconic acid, maleic acid, or fumaric acid in the preparation of the PSA.

Acrylic PSAs may also be made by including crosslinking agents in the formulation. Examples of cross-linking agents include copolymerizable polyfunctional ethylenically unsaturated monomers (e.g., 1,6-hexanediol diacrylate, trimethylolpropane triacrylate, pentaerythritol tetraacrylate, and 1,2-ethylene glycol diacrylate); ethylenically unsaturated compounds which in the excited state are capable of abstracting hydrogen (e.g., acrylated benzophenones such as described in U.S. Pat. No. 4,737,559 (Kellen et al.), p-acryloxy-benzophenone, which is available from Sartomer Company, Exton, PA, monomers described in U.S. Pat. No. 5,073,611 (Rehmer et al.) including p-N-(methacryloyl-4-oxapentamethylene)-carbamoyloxybenzophenone, N-(benzoyl-p-phenylene)-N'-(methacryloxymethylene)-carbodiimide, and p-acryloxy-benzophenone); nonionic crosslinking agents which are essentially free of olefinic unsaturation and capable of reacting with carboxylic acid groups, for example, in the second monomer described above (e.g., 1,4-bis(ethyleneiminocarbonylamino)benzene; 4,4-bis(ethyleneiminocarbonylamino)diphenylmethane; 1,8-bis(ethyleneiminocarbonylamino)octane; 1,4-tolylene diisocyanate; 1,6-hexamethylene diisocyanate, N,N'-bis-1,2-propyleneisophthalamide, diepoxides, dianhydrides, bis(amides), and bis(imides)); and nonionic crosslinking agents which are essentially free of olefinic unsaturation, are noncopolymerizable with the first and second monomers, and, in the excited state, are capable of abstracting hydrogen (e.g., 2,4-bis(trichloromethyl)-6-(4-methoxy)phenyl)-s-triazine; 2,4-bis(trichloromethyl)-6-(3,4-dimethoxy)phenyl)-s-triazine; 2,4-bis(trichloromethyl)-6-(3,4,5-trimethoxy)phenyl)-s-triazine; 2,4-bis(trichloromethyl)-6-(2,4-dimethoxy)phenyl)-s-triazine; 2,4-bis(trichloromethyl)-6-(3-methoxy) phenyl)-s-triazine as described in U.S. Pat. No. 4,330,590 (Vesley); 2,4-bis(trichloromethyl)-6-naphthenyl-s-triazine and 2,4-bis(trichloromethyl)-6-(4-methoxy)naphthenyl-s-triazine as described in U.S. Pat. No. 4,329,384 (Vesley)).

Typically, the first monomer is used in an amount of 80-100 parts by weight (pbw) based on a total weight of 100 parts of copolymer, and a second monomer as described above is used in an amount of 0-20 pbw based on a total weight of 100 parts of copolymer. The crosslinking agent can be used in an amount of 0.005 to 2 weight percent based on the combined weight of the monomers, for example from about 0.01 to about 0.5 percent by weight or from about 0.05 to 0.15 percent by weight.

The acrylic PSAs useful for practicing the present disclosure can be prepared, for example, in solvent or by a solvent free, bulk, free-radical polymerization process (e.g., using heat, electron-beam radiation, or ultraviolet radiation). Such polymerizations are typically facilitated by a polymerization initiator (e.g., a photoinitiator or a thermal initiator). The polymerization initiator is used in an amount effective to facilitate polymerization of the monomers (e.g., 0.1 part to about 5.0 parts or 0.2 part to about 1.0 part by weight, based on 100 parts of the total monomer content).

If a photocrosslinking agent is used, the coated adhesive can be exposed to ultraviolet radiation having a wavelength of about 250 nm to about 400 nm. The radiant energy in this range of wavelength required to crosslink the adhesive is about 100 millijoules/cm$^2$ to about 1,500 millijoules/cm2, or more specifically, about 200 millijoules/cm$^2$ to about 800 millijoules/cm$^2$.

A useful solvent-free polymerization method is disclosed in U.S. Pat. No. 4,379,201 (Heilmann et al.). Initially, a mixture of first and second monomers can be polymerized with a portion of a photoinitiator by exposing the mixture to UV radiation in an inert environment for a time sufficient to form a coatable base syrup, and subsequently a crosslinking agent and the remainder of the photoinitiator may be added. This final syrup containing a crosslinking agent (e.g., which may have a Brookfield viscosity of about 100 centipoise to about 6000 centipoise at 23° C., as measured with a No. 4 LTV spindle, at 60 revolutions per minute) can then be coated onto a substrate, for example, a polymeric film substrate. Once the syrup is coated onto the substrate, for example, the polymeric film substrate, further polymerization and crosslinking can be carried out in an inert environment (e.g., nitrogen, carbon dioxide, helium, and argon, which exclude oxygen). A sufficiently inert atmosphere can be achieved by covering a layer of the photoactive syrup with a polymeric film, such as silicone-treated PET film, that is transparent to UV radiation or e-beam and irradiating through the film in air.

Solvent-based adhesives may contain ingredients such as those listed above, dissolved or dispersed in a solvent vehicle. Water-based adhesives would normally be based on emulsions of (co)polymeric materials. Suitable (co)polymeric materials include vinyl acetate and (meth)acrylic homopolymers and copolymers.

By selecting the composition, thickness, and coverage (e.g., continuous or discontinuous) of the pressure sensitive adhesive layer, the tape of the present disclosure can advantageously have a moisture vapor transmission rate of at least 3 perms, at least 4 perms, or at least 5 perms.

Methods and additives for making water vapor permeable adhesives are described, for example, in U.S. Pat. No. 5,198,064 (Tani et al.) and U.S. Pat. No. 9,562,174 (Russell) and U.S. Pat. Appl. Pub. No. 2015/0024159 (Bess).

In some embodiments, the tape of the present disclosure includes a liner. Various liners may be useful. In some embodiments, the liner comprises at least one of a polyester film, polyethylene film, polypropylene film, polyolefin coated polymer film, polyolefin coated paper, acrylic coated polymer film, and polymer coated kraft paper. The polyolefin coated film or paper may be polyethylene coated film or paper. Examples of suitable commercially available liners include those available under the trade designations "2.0 CL PET U4162/U4162", "48 #CL PET H/H UE1095/000", and "4 BU DHP UE1094B/000" from Loparex, Hammond, Wisconsin, a red pigmented, multilayer, thermoplastic olefin film containing a proprietary blend of high density polyethylene and low density polyethylene, having a thickness of about 63 micrometers (0.0025 inches), commercially available from Iso Poly Films, Incorporated, Gray Court, South Carolina, and a clear, polyester release liner available under the designation "2PAKN" from Mitsubishi Polyester Film, Inc., Greer, SC.

Referring again to FIG. 1, the present disclosure provides a tape 100 in which the pressure sensitive adhesive layer 140 is attached to a liner 150. The liner can be useful, for example, when the tape is wound into a roll. In some embodiments, the liner 150 is coated on at least one of the major surfaces with a release coating. In some embodiments both major surfaces of the liner 150 are coated with a release coating. In this case, the release coating may the same or different on each of the major surfaces of the liner 150. Examples of materials useful as release coatings for the liners disclosed herein include acrylics, silicones, siloxanes, fluoropolymers, and urethanes. In some embodiments, a silicone coating is useful for facilitating release of the pressure sensitive adhesive.

The liner may be produced using a variety of processing techniques. For example, liner processing techniques such as those disclosed in U.S. Pat. Appl. No. 2013/0059105 (Wright et al.) may be useful to produce a liner suitable for practicing the present disclosure. A suitable liner processing technique may include applying a layer comprising a (meth) acrylate-functional siloxane to a major surface of a substrate and irradiating that layer in a substantially inert atmosphere comprising no greater than 500 ppm oxygen with a short wavelength polychromatic ultraviolet light source having at least one peak intensity at a wavelength of from about 160 nanometers to about 240 nanometers. Irradiating can at least partially cure the layer. In some embodiments, the layer is cured at a curing temperature greater than 25° C. The layer may be at a temperature of at least 50° C., 60° C. 70° C., 80° C., 90° C., 100° C., 125° C., or at least 150° C., in some embodiments, no more than 250° C., 225° C., 200° C., 190° C., 180° C., 170° C., 160° C., or 155° C.

Alternatively, the second major surface 124 of the fibrous layer 120 may include an overlaid or overcoated low surface energy release layer or low adhesion backsize (LAB), which may be useful for making a linerless article.

In some embodiments, the article of the present disclosure and/or made by the methods disclosed herein includes a substrate. The substrate can be made from a variety of materials such as wood, vinyl, metal, or concrete. In some embodiments, the tape of the present disclosure may be simultaneously adhered to two different substrates (e.g., side-by-side substrates). Useful substrates can include at least one of an air and water barrier film, a subfloor, a window frame, a door frame, and wall sheathing materials (e.g., oriented strand board (OSB), foam insulation sheathing, exterior grade gypsum sheathing board, concrete, concrete masonry units (CMUs)). The substrate, in some cases, can be compacted soil or gravel. The substrate may be horizontal or vertical. In some embodiments, the article of the present disclosure and/or made by the methods disclosed herein is at least a portion of an interior wall, an exterior wall, a floor, a ceiling, or a roof. In some embodiments, the article of the present disclosure is a heated floor. Electrical heating elements, for example, can be installed on a subfloor underneath the tape of the present disclosure, for example.

A method of the present disclosure includes applying the tape disclosed herein to the substrate using the pressure sensitive adhesive layer, applying a composition comprising at least one of gypsum, lime, or cement to the second major surface of the fibrous layer, and at least one of curing or drying the composition to form the composite layer on the second major surface of the fibrous layer. The substrates can be any of those described above.

Figure 3:
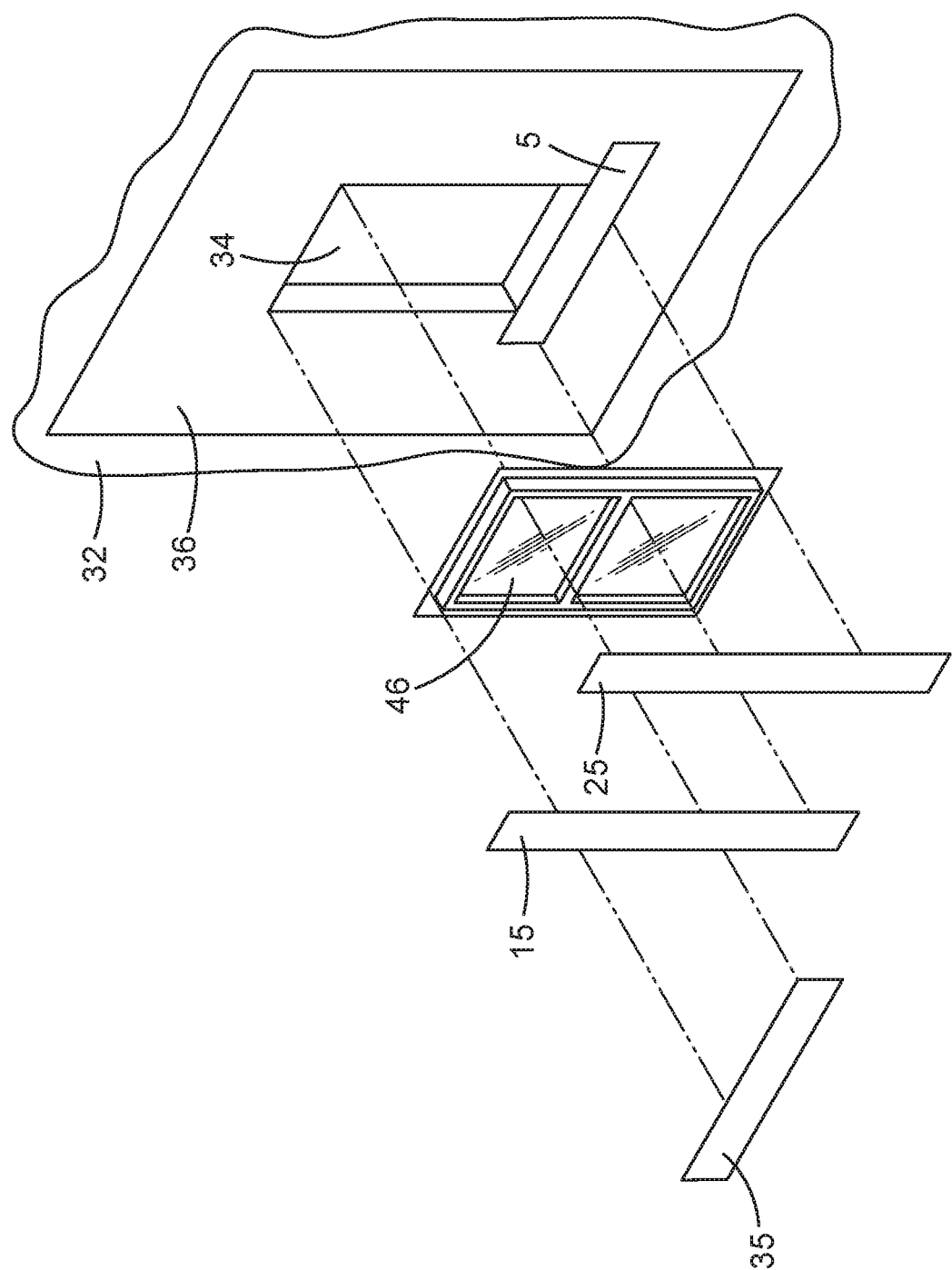
FIG. 3 is a perspective view of another embodiment of a tape of the present disclosure, applied to a window frame.

The present disclosure also provides a method of installing a window or door. FIG. 3 is a perspective, exploded view of an embodiment of a tape disclosed herein, applied to a window frame. FIG. 3 illustrates a window opening 34 in wall sheathing 32 that is optionally covered with building wrap 36. Suitable materials for wall sheathing include plywood, oriented strand board (OSB), foam insulation sheathing, exterior grade gypsum sheathing board, concrete, concrete masonry units (CMUs), and other conventional sheathing materials commonly used in the construction industry. As shown in FIG. 3, tape 5, as described in any of the above embodiments, is applied on building wrap 36 or wall sheathing 32 level with the bottom edge of the rough opening frame 34 to form a sill flashing. Windowsill pans may be installed in the opening and the first layer 5 can overlap the sill pan. Window 46 is inserted into opening 34. Typically, the window frame fits within the opening and flanges extend from the window frame and over the wall sheathing. The window flanges are secured to the wall. Tape 15 and 25 of the present disclosure can also be applied on the window jambs extending from the window flange and onto the building wrap 36 or wall sheathing 32. Tape 35 of the present disclosure can also be applied at the top flange on the window and the sheathing. Cutting a flap of building wrap 36 to expose the wall sheathing 32 can allow clearance for the tape 35 at the top of the window. Then a composite composition (e.g., mortar, stucco, plaster, or concrete) can be applied over the sheathing, building wrap, and first layers to provide an embodiment of an article of the present disclosure.

In some embodiments, the substrate for the article of the present disclosure and/or made according to the method of the present disclosure includes an air and water barrier film. The air and water barrier film can be, for example, a building wrap as described above or a membrane used under a concrete floor or on an interior wall. In some embodiments in which the article of the present disclosure includes an air and water barrier, the tape of the present disclosure can be useful as seaming tape or flashing tape, for example. The air and water barrier film may be water vapor impermeable or water vapor permeable. In some embodiments, the water vapor permeable air and water barrier film includes a water vapor permeable polymeric layer disposed on a first major surface of a porous layer. The polymeric layer may at least one of completely cover or impregnate the porous layer. In some of these embodiments, the polymeric layer is crosslinked. In some embodiments, the polymeric layer comprises a polyoxyalkylene polymer having at least one crosslink site derived from an alkoxy silane. The porous layer having the polymeric layer thereon may be any of the fibrous layers described above in combination with any of the polymeric layers described above. In some embodiments, the water vapor permeable air and water barrier film is as described in Int. Pat. Appl. Pub. Nos. WO 2015/183354 (Widenbrant), WO 2015/126931 (Seabaugh), WO 2017/031275 (Widenbrant), WO 2017/031359 (Widenbrant), or WO 2017/112756 (Seabaugh).

The tape of the present disclosure can have a wide variety of widths. Useful widths for a flashing tape or a sealing tape can include between 2 inches (5.1 cm) and 18 inches (45.7 cm) in width. In some embodiments, the width of the tape is at least 2.5 cm. In some embodiments, the width of the tape is at least 5 cm. In some embodiments, the width of the tape is at most 75 cm (29.5 inches), 45 cm (17.7 inches), 30.5 cm (12 inches), or 10 cm (3.9 inches).

Some Embodiments of the Disclosure

In a first embodiment, the present disclosure provides a tape comprising:
- an air and water barrier article that is water vapor permeable, the air and water barrier article comprising a fibrous layer having first and second major surfaces and a polymeric layer disposed on a first major surface of the fibrous layer and penetrating into the fibrous layer leaving at least some fibers exposed on the second major surface; and
- a pressure sensitive adhesive layer disposed on the polymeric layer of the air and water barrier article,
- wherein the tape retains greater than 50 percent by weight of mortar applied according to the Vertical Mortar Receptivity Evaluation.

In a second embodiment, the present disclosure provides the tape of the first embodiment, wherein the pressure sensitive adhesive layer is continuous.

In a third embodiment, the present disclosure provides the tape of the first or second embodiment, wherein the tape has a water vapor permeability of at least three perms, and/or the pressure sensitive adhesive has a permeance in a range from 1 perm to 10 perms.

In a fourth embodiment, the present disclosure provides the tape of any one of the first to third embodiments, wherein the tape passes at least one of Modified Test 1 of ASTM D-1970/D-1970M-13, Modified Test 2 of ASTM D-1970/D-1970M-13, or Modified Test 3 of ASTM D-1970/D-1970M-13.

In a fifth embodiment, the present disclosure provides the tape of any one of the first to fourth embodiments, wherein the polymeric layer is crosslinked.

In a sixth embodiment, the present disclosure provides the tape of any one of the first to fifth embodiments, wherein the polymeric layer comprises a polyoxyalkylene polymer having at least one crosslink site derived from any alkoxy silane.

In a seventh embodiment, the present disclosure provides the tape of any one of the first to sixth embodiments, wherein the polymeric layer is derived from a polyoxyalkylene polymer in which all of the end groups are silyl terminated.

In an eighth embodiment, the present disclosure provides the tape of the seventh embodiment, wherein the polyoxyalkylene polymer further comprises at least one silyl modified branched group.

In a ninth embodiment, the present disclosure provides the tape of any one of the first to eighth embodiments, wherein the fibrous layer comprises a nonwoven fabric, a woven fabric or a knitted fabric.

In a tenth embodiment, the present disclosure provides the tape of the ninth embodiment, wherein the fibrous layer comprises a nonwoven fabric.

In an eleventh embodiment, the present disclosure provides the tape of any one of the first to tenth embodiments, wherein the fibrous layer comprises at least one of a polyester, polylactic acid, polyolefin, polyamide, or rayon.

In a twelfth embodiment, the present disclosure provides the tape of any one of the first to eleventh embodiments, wherein the tape is in the form of a roll, and wherein in the roll, the adhesive is in contact with a release surface.

In a thirteenth embodiment, the present disclosure provides the tape of any one of the first to twelfth embodiments, further comprising a release liner disposed on the pressure sensitive adhesive layer.

In a fourteenth embodiment, the present disclosure provides an article comprising:
- a substrate;
- the tape of any one of the first to eleventh embodiment, wherein the pressure sensitive adhesive layer attaches the tape to the substrate; and
- a composite layer comprising at least one of gypsum, lime, or cement, wherein the composite layer is at least one of dried or cured on the second major surface of the fibrous layer.

In a fifteenth embodiment, the present disclosure provides an article comprising:
- a substrate;
- a tape comprising:
  - an air and water barrier article that is water vapor permeable, the air and water barrier article comprising a fibrous layer having first and second major surfaces and a polymeric layer disposed on a first major surface of the fibrous layer and penetrating into the fibrous layer leaving at least some fibers exposed on the second major surface; and
  - a pressure sensitive adhesive layer disposed on the polymeric layer of the air and water barrier article, wherein the pressure sensitive adhesive layer attaches the tape to the substrate; and
- a composite layer comprising at least one of gypsum, lime, or cement, wherein the composite layer is at least one of dried or cured on the second major surface of the fibrous layer.

In a sixteenth embodiment, the present disclosure provides the article of the fifteenth embodiment, wherein the pressure sensitive adhesive layer is continuous.

In a seventeenth embodiment, the present disclosure provides the article of the fifteenth or sixteenth embodiment, wherein the tape has a water vapor permeability of at least three perms, and/or wherein the pressure sensitive adhesive has a permeance in a range from 1 perm to 10 perms.

In an eighteenth embodiment, the present disclosure provides the article of any one of the fifteenth to seventeenth embodiments, wherein the tape passes at least one of Modified Test 1 of ASTM D-1970/D-1970M-13, Modified Test 2 of ASTM D-1970/D-1970M-13, or Modified Test 3 of ASTM D-1970/D-1970M-13.

In a nineteenth embodiment, the present disclosure provides the article of any one of the fifteenth to eighteenth embodiments, wherein the polymeric layer is crosslinked.

In a twentieth embodiment, the present disclosure provides the article of any one of the fifteenth to nineteenth embodiments, wherein the polymeric layer comprises a polyoxyalkylene polymer having at least one crosslink site derived from any alkoxy silane.

In a twenty-first embodiment, the present disclosure provides the article of any one of the fifteenth to twentieth embodiments, wherein the polymeric layer is derived from a polyoxyalkylene polymer in which all of the end groups are silyl terminated.

In a twenty-second embodiment, the present disclosure provides the article the twenty-first embodiment, wherein the polyoxyalkylene polymer further comprises at least one silyl modified branched group.

In a twenty-third embodiment, the present disclosure provides the article of any one of the fifteenth to twenty-second embodiment, wherein the fibrous layer comprises a nonwoven fabric, a woven fabric or a knitted fabric.

In a twenty-fourth embodiment, the present disclosure provides the article of the twenty-third embodiment, wherein the fibrous layer comprises a nonwoven fabric.

In a twenty-fifth embodiment, the present disclosure provides the article of any one of the fifteenth to twenty-fourth embodiments, wherein the fibrous layer comprises at least one of a polyester, polylactic acid, polyolefin, polyamide, or rayon.

In a twenty-sixth embodiment, the present disclosure provides the article of any one of the fourteenth to twenty-fifth embodiment, wherein the substrate comprises at least one of an air and water barrier film, a subfloor, a window frame, or a door frame.

In a twenty-seventh embodiment, the present disclosure provides the article of the twenty-sixth embodiment, wherein the substrate comprises a window frame or a door frame.

In a twenty-eighth embodiment, the present disclosure provides the article of any one of the fourteenth to twenty-sixth embodiments, wherein the substrate comprises at least one of wood, vinyl, metal, or concrete.

In a twenty-ninth embodiment, the present disclosure provides the method of any one of the fourteenth to twenty-eighth embodiments, wherein the article is an interior wall, an exterior wall, a floor, a ceiling, or a roof.

In a thirtieth embodiment, the present disclosure provides a method of making the article of any one of the fourteenth to twenty-ninth embodiments, the method comprising:
  applying the tape to the substrate using the pressure sensitive adhesive layer;
  applying a composition comprising at least one of gypsum, lime, or cement to the second major surface of the fibrous layer; and
  at least one of curing or drying the composition to form the composite layer on the second major surface of the fibrous layer.

In a thirty-first embodiment, the present disclosure provides the method of the thirtieth embodiment, wherein the composition further comprises at least one of water or aggregate.

In a thirty-second embodiment, the present disclosure provides the method of the twenty-ninth or thirtieth embodiment, wherein the composition comprises lime.

In a thirty-third embodiment, the present disclosure provides a method of installing at least one of a door or window, the method comprising:
  attaching a tape to at least a portion of a door or window frame, the tape comprising:
    an air and water barrier article that is water vapor permeable, the air and water barrier article comprising a fibrous layer having first and second major surfaces and a polymeric layer disposed on a first major surface of the fibrous layer and penetrating into the fibrous layer leaving at least some fibers exposed on the second major surface; and
    a pressure sensitive adhesive layer disposed on the polymeric layer of the air and water barrier article, wherein the pressure sensitive adhesive layer attaches the tape to the portion of the door or window frame;
  applying a composition comprising at least one of gypsum, lime, or cement to the second major surface of the fibrous layer; and
  at least one of curing or drying the composition to form a composite layer on the second major surface of the fibrous layer.

In a thirty-fourth embodiment, the present disclosure provides the method of the thirty-third embodiment, wherein the pressure sensitive adhesive layer is continuous.

In a thirty-fifth embodiment, the present disclosure provides the method of the thirty-third or thirty-fourth embodiment, wherein the tape has a water vapor permeability of at least three perms, and/or wherein the pressure sensitive adhesive has a permeance in a range from 1 perm to 10 perms.

In a thirty-sixth embodiment, the present disclosure provides the method of any one of the thirty-third to thirty-fifth embodiments, wherein the tape passes at least one of Modified Test 1 of ASTM D-1970/D-1970M-13, Modified Test 2 of ASTM D-1970/D-1970M-13, or Modified Test 3 of ASTM D-1970/D-1970M-13.

In a thirty-seventh embodiment, the present disclosure provides the method of any one of the thirty-third to thirty-sixth embodiments, wherein the polymeric layer is cross-linked.

In a thirty-eighth embodiment, the present disclosure provides the method of any one of the thirty-third to thirty-seventh embodiments, wherein the polymeric layer comprises a polyoxyalkylene polymer having at least one cross-link site derived from any alkoxy silane.

In a thirty-ninth embodiment, the present disclosure provides the method of any one of the thirty-third to thirty-sixth embodiments, wherein the polymeric layer is derived from a polyoxyalkylene polymer in which all of the end groups are silyl terminated.

In a fortieth embodiment, the present disclosure provides the method of the thirty-ninth embodiment, wherein the polyoxyalkylene polymer further comprises at least one silyl modified branched group.

In a forty-first embodiment, the present disclosure provides the method of any one of the thirty-third to fortieth embodiments, wherein the fibrous layer comprises a nonwoven fabric, a woven fabric or a knitted fabric.

In a forty-second embodiment, the present disclosure provides the method of the forty-first embodiment, wherein the fibrous layer comprises a nonwoven fabric.

In a forty-third embodiment, the present disclosure provides the method of any one of the thirty-third to forty-second embodiments, wherein the fibrous layer comprises at least one of a polyester, polylactic acid, polyolefin, polyamide, or rayon.

In a forty-fourth embodiment, the present disclosure provides the method of any one of the thirty-third to forty-third embodiments, wherein the composition further comprises at least one of water or aggregate.

In a forty-fifth embodiment, the present disclosure provides the method of any one of the thirty-third to forty-fourth embodiments, wherein the composition comprises lime.

In order that this disclosure can be more fully understood, the following examples are set forth. It should be understood that these examples are for illustrative purposes only and are not to be construed as limiting this disclosure in any manner.

EXAMPLES

| Materials | |
|---|---|
| KANEKA MS S203H POLYMER | A liquid, silyl-terminated polyether derived from a polyether polymer backbone and having methyldimethoxysilane functional groups and a viscosity of 6000 to 10,000 centiPoise, available under the trade designation KANEKA MS POLYMER S203H from Kaneka North America, LLC, Pasadena, TX |
| KANEKA SILYL SAX530 | A liquid, silyl-terminated polyether derived from a polyether polymer backbone and having trimethoxysilane functional groups and a viscosity of 4500 to 9,000 centiPoise, available under the trade designation KANEKA SILYL SAX530 from Kaneka North America, LLC, Pasadena, TX |
| AEROSIL R202 | A hydrophobic fumed silica after treated with a polydimethylsiloxane, available under the trade designation AEROSIL R202 from Evonik Corporation, Parsippany, NJ |
| OMYACARB 5-FL | A beneficiated calcium carbonate having a mean particle size of 6.3 micrometers and a calcium carbonate content of 98%, available under the trade designation OMYACARB 5-FL fromOmya Incorporated, Cincinnati, OH |
| TIONA 696 | A non-chalking, chloride-process rutile titanium dioxide pigment having a titanium dioxide content of 92%, and a surface treatment of alumina, silica, organic, available under the trade designation TIONA 696 from Cristal, Hunt Valley, MD |
| DYNASYLAN DAMO-T | A liquid, bifunctional organosilane having two reactive amino groups and hydrolyzable inorganic methoxysilyl groups, available under the trade designation DYNASYLAN DAMO- T from Evonik Corporation, Parsippany, NJ |
| DYNASYLAN VTMO | A liquid, bifunctional organosilane having a reactive vinyl group and a hydrolysable inorganic trimethoxysilyl group, available under the trade designation DYNASYLAN VTMO from Evonik Corporation, Parsippany, NJ |
| NEOSTAN U-220 | A liquid catalyst based on dibutyl tin bis(acetylacetonate) having a tin content of 27.5%, available under the trade designation NEOSTAN U-220H from Nitto Kasei Company, Ltd., Osaka, Japan |
| IOA | Isooctyl acrylate, obtained from 3M Company, St. Paul, MN |
| AA | Acrylic acid, obtained from Alfa Aesar, Ward Hill, MA |
| IRG 651 | 2-dimethoxy-2-phenylacetophenone, obtained under the trade designation "IRGACURE 651" available from BASF Corporation, Florham Park, NJ |
| F85 | A glycerol ester of highly hydrogenated wood rosin, available under the trade designation "FORAL 85LB" from Pinova Incorporated, Brunswick GA |
| TRIZ | 2,6-bis-trichloromethyl-6-(3,4-dimethoxyphenyl)-s-triazine available from TCI America, Portland, OR |
| LUTRADUR LD-7270 | A white spunbond coarse fiber filter media containing 100% polyester and having an areal weight of 70 grams/square meter (2.06 ounces/square yard) and an air permeability of (670 cubic feet/minute)/square foot), available under the designation Lutradur LD-7270 from Midwest Filtration, Cincinnati, OH |
| 2PAKN | A 1.42 mil thick, single sided, clear polyester release liner available under the designation 2PAKN from Mitsubishi Polyester Film, Inc., Greer, SC |

Test Methods
Nail Sealability

Nail sealability of air and water barrier articles was evaluated generally as described in ASTM D-1970/D-1970M-13: "Standard Specification for Self-Adhering Polymer Modified Bituminous Sheet Materials Used as Steep Roofing Underlayment for Ice Dam Protection", Paragraph 7.9: "Self Sealability. Head of Water Test" with some modifications. All materials were conditioned at (23° C. (73° F.)) for at least 24 hours prior to use. Three different modified tests can be employed. Samples are considered to have passed at least one of the tests if 3 or 4 nail areas on the plywood substrate are free of dye staining.

Modified Test 1 of ASTM D-1970/D-1970M-13

A Plywood Substrate (APA Grade, Exposure 1) Having a Thickness of 1.27 cm (0.5 Inches) was employed; four nails were driven through the air and water barrier article into the plywood substrate until 6.35 millimeters (0.25 inches) remained above the exposed surface of the air and water barrier article; and a red dye was added to the water. After exposure the surface of plywood substrate in contact with the air and water barrier article (referred to herein as the "topside"), and the surface of the plywood substrate opposite the topside (referred to herein as the "bottomside") were inspected visually by unaided eye for signs of water leakage as determined by the presence of red-stained areas around each of the four nails. Such stained areas would be indicative of failure of the air and water barrier article to form a seal around the nails. The data in Table 3, below, is reported as the number of the nail areas on the plywood substrate that were free of dye staining.

Modified Test 2 of ASTM D-1970/D-1970M-13

Modified Test 2 was conducted in the same manner as Modified Test 1 with the following change. The four nails were driven through the air barrier article into the plywood substrate until the nail head contacted the top surface of the air and water barrier article, then the nail was backed out until 6.35 millimeters (0.25 inches) remained above the exposed surface of the air and water barrier article.

Modified Test 3 of ASTM D-1970/D-1970M-13.

Modified Test 3 was conducted in the same manner as Modified Test 2 with the following modification. The nails were not backed out.

Horizontal Mortar Receptivity Evaluation

Tape samples measuring 1 inch by at least 6 inches (2.54 centimeters by at least 15.2 centimeters) were adhered to an aluminum panel measuring 2 inches by 5 inches by 0.062 inches (5.1 centimeters by 12.7 centimeters by 1.59 millimeters) by passing a 4.5 pound (2.04 kilogram) rubber roller twice in each direction over the tape such that the pressure sensitive adhesive layer of the tape intimately contacted the aluminum panel. A rectangular shaped polyethylene mold measuring 4.5 inches by 2 inches by 0.75 inches (11.4 centimeters by 5.1 centimeters by 1.9 centimeters) and having three cavities, each measuring 2.54 centimeters by 2.54 centimeters by 1.9 centimeters, was positioned over the aluminum panel on the exposed tape surface, and a mortar mixture containing 108 grams type 1 Portland cement, 216 grams utility sand obtained from TCC Materials, Mendota Heights, Minn., and 76 grams of clean potable water poured into the cavities to fill them. Next, a metal "S" shaped hook having a top to bottom straight line length of 3.3 centimeters was embedded in the concrete mixture such that about half its length protruded up above the mixture. The mortar was allowed to cure for seven days at room temperature on the tape, after which the mold was-removed, and the force required to remove the cured concrete block from the tape was measured using a tensile tester obtained from MTS Systems Corporation, Eden Prairie, Minn., equipped with a 22.5 pound (10.2 kilogram) load cell at a rate of 1 inch (2.54 cm)/minute. The "S" hook was pulled up (perpendicular)

from the panel. Three samples were evaluated, and the average value of the three samples was reported in Newtons (N).

Vertical Mortar Receptivity Evaluation

Tape samples (6 inches by 6 inches) (15.2 cm by 15.2 cm) were adhered to a plywood panel (as used for nail sealability evaluation above, APA grade, exposure 1) which was affixed to a wall in the vertical position. 100 grams of mortar, the same mixture as described in the Horizontal Mortar Receptivity Evaluation, was applied to the plywood panel using a trowel. Some of the mortar flowed and fell away from the panel due to the force of gravity. The panels remained vertical for at least 30 seconds, at which point the mortar was no longer flowing. The panel was weighed and then placed on a nearby shelf to sit vertically until they cured. There was no additional mortar loss from the panel while curing. Results were reported as a weight percentage of mortar adhered to the tape at the end of application, relative to the 100 grams initially applied.

Example 1

A tape having a fibrous layer partially impregnated with a polymeric material and having a pressure sensitive adhesive layer disposed on polymeric material opposite the fibrous layer was prepared as follows. The polymeric material composition was provided by charging the following materials into a mixing vessel which was then placed in a dual asymmetric centrifuge mixer: 27.9 parts by weight (hereinafter abbreviated as "pbw") of silyl-terminated polyether "KANEKA MS POLYMER S203H", 16.8 pbw of silyl-terminated polyether "KANEKA MS POLYMER SAX 530", 1.39 pbw of hydrophobic fumed silica "AEROSIL R202", 44.4 pbw of calcium carbonate "OMYACARB 5-FL", and 4.8 pbw of titanium oxide "TIONA 696". After mixing at 2500 rpm for four minutes, 1.0 pbw of aminosilane "DYNASYLAN DAMO-T", 1.0 pbw of vinyl trimethoxysilane "DYNASYLAN VTMO", and 0.3 pbw of tin catalyst "NEOSTANN U-220H" were added and mixed at 2500 rpm for two minutes. This final mixture was used to coat polyester release liner "2PAKN" using a notch bar coater having a gap setting that was 0.30 millimeters (0.012 inches) greater than the thickness of the release liner. The polymeric material-coated release liner was then laminated to spunbond fibrous layer "LUTRADUR LD-7270" at room temperature (23° C. (73° F.)) using a hand roller and light pressure. This laminate construction was cured at 93° C. (200° F.) for 8 hours. This gave an air and water barrier article with a continuous layer of polymeric material on one side of the fibrous layer and a release liner on the side of the continuous layer of the polymeric material opposite that of the fibrous layer. The release liner was removed from the article exposing the continuous coating side.

A pressure sensitive adhesive precursor composition was prepared by mixing 99 pbw isooctyl acrylate (IOA), 1 pbw acrylic acid (AA), and 0.04 pbw of photoinitiator "IRGACURE 651". This mixture was partially polymerized under a nitrogen atmosphere by exposure to low intensity ultraviolet radiation to provide a coatable syrup having a viscosity of about 4000 cps. An additional 0.26 pbw of "IRGACURE 651" photoinitiator, 0.13 pbw of TRIZ, and 6 pbw of tackifier "FORAL 85LB" were added to the syrup and mixed until all of the components had completely dissolved to give a pressure sensitive adhesive precursor composition. The adhesive precursor composition was then coated onto the siliconized side of polyester release liner "2PAKN" using a notch bar with a 0.076 mm (0.003 inches) gap setting greater than the thickness of the release liner. The adhesive precursor was then exposed to an ultraviolet radiation source having a spectral output from 300 to 400 nanometers with a maximum at 351 nanometers in a nitrogen-rich environment. An irradiance of about 9.0 milliWatts/square centimeter was used during the exposure time, resulting in a total energy of 1800 milliJoules/square centimeter. The result was a pressure sensitive adhesive coated release liner.

For Modified Test 1 of ASTM D-1970/D-1970M-13 and Vertical Mortar Receptivity Evaluation, the pressure sensitive adhesive layer was transfer laminated from the release liner to the plywood substrate using hand pressure. Next, the air and water barrier article was laminated by hand to the plywood substrate such that the continuous polymeric layer side of the article covered and was attached to the pressure sensitive adhesive layer. Plywood substrates having a tape including an adhesive-coated air and water barrier article were then evaluated for nail sealability and vertical mortar receptivity.

In the same manner, the pressure sensitive adhesive was transfer laminated to the aluminum panel followed by the air and water barrier article such that the continuous polymeric layer side of the article was attached to the pressure sensitive adhesive for the Horizontal Mortar Receptivity Evaluation.

The results are reported in Tables 1 to 3, below.

Comparative Example 1 (CE 1)

A black-colored single sided adhesive tape having a high-performance adhesive on a special film/nonwoven fleece combination made of polyolefin (PO) and having a perforation zone, available under the trade designation "FENTRIM 2" from SIGA, Ruswil, Switzerland, was evaluated for nail sealability and horizontal and vertical mortar receptivity using the test methods described above. The results are reported in Tables 1 to 3, below.

Comparative Example 2 (CE 2)

An airtight tape having polypropylene spunbond nonwovens on both sides of a water-vapor permeable membrane, available under the trade designation "TESCON VANA" from Pro Clima, MOLL bauokologische Produkte GmbH, Schwetzingen, Germany, was evaluated for nail sealability and horizontal and vertical mortar receptivity using the test methods described above. The results are reported in Tables 1 to 3, below.

Comparative Example 3 (CE 3)

Example 1 was repeated with the following modification. The air and water barrier article was laminated by hand to the test substrates (that is, plywood or aluminum) such that the fibrous layer side of the article covered and was attached to the pressure sensitive adhesive layer. Comparative Example 3 was evaluated for nail sealability and horizontal and vertical mortar receptivity using the test methods described above. The results are reported in Tables 1 to 3, below.

TABLE 1

Pull Adhesion Data for Horizonal Mortar Receptivity Evaluation (SI units?)

| Example | Pull Adhesion, lbs/in² (MPa) |
|---|---|
| 1 | 10.70 (0.074) |
| CE 1 | 25.3 (0.174) |
| CE 2 | 13.2 (0.091) |
| CE 3 | 16.7 (0.115) |

TABLE 2

Vertical Mortar Receptivity Evaluation

| Example | Mortar acceptance (% of applied) |
|---|---|
| 1 | 88.7% |
| CE 1 | 78.1% |
| CE 2 | 88.9% |
| CE 3 | 45.0% |

TABLE 3

Nail Sealability per Modified Test 1 of ASTM D-1970/D-1970M-13

| Example | Nail Sealability (passing nails) |
|---|---|
| 1 | 4 |
| CE 1 | 0 |
| CE 2 | 0 |
| CE 3 | 4 |

Example 2

A pressure sensitive adhesive precursor composition was prepared by mixing 98 parts pbw isooctyl acrylate (IDA), 2 pbw acrylic acid (AA), and 0.03 pbw of photoinitiator "IRGACURE 651". This mixture was partially polymerized under a nitrogen atmosphere by exposure to low intensity ultraviolet radiation to provide a coatable syrup having a viscosity of about 4000 cps. An additional 0.21 pbw of "IRGACURE 651" photoinitiator and 0.10 pbw of TRIZ were added to the syrup and mixed until all of the components had completely dissolved to give a pressure sensitive adhesive precursor composition. The adhesive precursor composition was then coated onto a two-sided silicone release liner on poly-coated kraft paper using a notch bar with a 0.127 mm (0.005 inches) gap setting greater than the thickness of the release liner. The adhesive precursor was then exposed to an ultraviolet radiation source having a spectral output from 300 to 400 nanometers with a maximum at 351 nanometers in a nitrogen-rich environment. An irradiance of about 9.0 milliWatts/square centimeter was used during the exposure time, resulting in a total energy of 1800 milliJoules/square centimeter. The result was a pressure sensitive adhesive coated release liner. The adhesive was laminated to the easy side of a polyester dual-coated liner obtained from Loparex, Hammond, Wisconsin, under the trade designation "LOPAREX 7300/7350".

Water Vapor Transmission and Permeance

A shallow aluminum dish with an opening having an area of 3.68 in.² (23.75 cm²) was filled with 20 g of "DRIRITE" desiccant. A circular specimen having a diameter of 3 in. (7.6 cm) was cut from the adhesive and the "LOPAREX 7300/7350" polyester liner was removed to expose the adhesive coating. The adhesive was then rolled onto the continuous layer of polymeric material of an air and water barrier article prepared as described in Example 1 The paper release liner was removed and the circular adhesive specimen on the air and water barrier article was cut out to provide a tape specimen. The tape specimen was adhered to the lip of the dish and the edges rolled down to ensure a flat specimen surface. Holes were made in the specimen with a needle to account for the pins on the dish. A rubber gasket was applied over the adhesive and the dish pins, then an aluminum ring was placed over the rubber gasket and aluminum pins. Finally, the threaded cover to the aluminum dish was placed tightly on the dish. The full construction of the dish, specimen, and desiccant was weighed using an analytical balance. The dish was placed in a controlled environment room with a temperature of 74° F. (23° C.) and a 50% relative humidity (RH). Six additional measurements were taken for the dish over the course of 4 days. Water vapor transmission and permeance were calculated according to the equations given in ASTM E96. The tape of Example 2 had a permeance of 4.96+/−0.28 Perms.

This disclosure may take on various modifications and alterations without departing from its spirit and scope. Accordingly, this disclosure is not limited to the above-described embodiments but is to be controlled by the limitations set forth in the following claims and any equivalents thereof. This disclosure may be suitably practiced in the absence of any element not specifically disclosed herein.

What is claimed is:

1. A tape comprising:
   an air and water barrier article that is water vapor permeable, the air and water barrier article comprising a fibrous layer having first and second major surfaces and a polymeric layer disposed on a first major surface of the fibrous layer and penetrating into the fibrous layer leaving at least some fibers exposed on the second major surface; and a pressure sensitive adhesive layer disposed on the polymeric layer of the air and water barrier article,
   wherein the tape retains greater than 50 percent by weight of mortar applied according to the Vertical Mortar Receptivity Evaluation, and wherein the tape passes at least one of Modified Test 1 of ASTM D-1970/D-1970M-13, Modified Test 2 of ASTM D-1970/D-1970M-13, or Modified Test 3 of ASTM D-1970/D-1970M-13.

2. The tape of claim 1, wherein the pressure sensitive adhesive layer is continuous.

3. The tape of claim 1, wherein the tape has a water vapor permeability of at least three perms.

4. The tape of claim 1, wherein the polymeric layer is crosslinked.

5. The tape of claim 1, wherein the polymeric layer comprises a polyoxyalkylene polymer having at least one crosslink site resulting from condensation of an alkoxy silane.

6. The tape of claim 1, wherein the fibrous layer comprises a nonwoven fabric, a woven fabric, or a knitted fabric.

7. The tape of claim 1, wherein the pressure sensitive adhesive has a permeance in a range from 1 perm to 10 perms.

8. The tape of claim 1, wherein the pressure sensitive adhesive is attached to a substrate, and wherein a composite layer comprising at least one of gypsum, lime, or cement is at least one of dried or cured on the second major surface of the fibrous layer.

9. An article comprising:
   a substrate;
   a tape comprising:
      an air and water barrier article that is water vapor permeable, the air and water barrier article comprising a fibrous layer having first and second major surfaces and a polymeric layer disposed on a first major surface of the fibrous layer and penetrating into the fibrous layer leaving at least some fibers exposed on the second major surface; and
      a pressure sensitive adhesive layer disposed on the polymeric layer of the air and water barrier article, wherein the tape retains greater than 50 percent by weight of mortar applied according to the Vertical Mortar Receptivity Evaluation, wherein the pressure sensitive adhesive layer attaches the tape to the substrate, and wherein the tape passes at least one of Modified Test 1 of ASTM D-1970/D-1970M-13, Modified Test 2 of ASTM D-1970/D-1970M-13, or Modified Test 3 of ASTM D-1970/D-1970M-13; and
   a composite layer comprising at least one of gypsum, lime, or cement, wherein the composite layer is at least one of dried or cured on the second major surface of the fibrous layer.

10. The article of claim 9, wherein the pressure sensitive adhesive layer is continuous.

11. The article of claim 9, wherein the polymeric layer comprises a polyoxyalkylene polymer having at least one crosslink site resulting from condensation of an alkoxy silane.

12. The article of claim 9, wherein the fibrous layer comprises a nonwoven fabric, a woven fabric, or a knitted fabric.

13. The article of claim 9, wherein the article is at least a portion of an interior wall, an exterior wall, a floor, a ceiling, or a roof.

14. The article of claim 9, wherein the substrate comprises at least one of wood, vinyl, metal, or concrete.

15. The article of claim 9, wherein the tape has a water vapor permeability of at least three perms.

16. The article of claim 9, wherein the polymeric layer is crosslinked.

17. The article of claim 9, wherein the pressure sensitive adhesive has a permeance in a range from 1 perm to 10 perms.

18. A method of making the article of claim 9, the method comprising:
   applying the tape to the substrate using the pressure sensitive adhesive layer; applying a composition comprising at least one of gypsum, lime, or cement to the second major surface of the fibrous layer; and
   at least one of curing or drying the composition to form the composite layer on the second major surface of the fibrous layer.

19. The method of claim 18, wherein the composition further comprises at least one of water or aggregate.

* * * * *